United States Patent
Tanemura et al.

(10) Patent No.: US 9,927,832 B2
(45) Date of Patent: Mar. 27, 2018

(54) INPUT DEVICE HAVING A REDUCED BORDER REGION

(71) Applicant: Synaptics Incorporated, San Jose, CA (US)

(72) Inventors: Tetsuo Tanemura, Yokohama (JP); Koji Kokubu, Kawasaki (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 506 days.

(21) Appl. No.: 14/448,527

(22) Filed: Jul. 31, 2014

(65) Prior Publication Data

US 2015/0309531 A1 Oct. 29, 2015

Related U.S. Application Data

(60) Provisional application No. 61/984,656, filed on Apr. 25, 2014.

(51) Int. Cl.
  *G06F 1/16* (2006.01)
  *G06F 3/044* (2006.01)

(52) U.S. Cl.
  CPC .............. *G06F 1/16* (2013.01); *G06F 1/1643* (2013.01); *G06F 3/044* (2013.01); *G06F 2203/04103* (2013.01); *G06F 2203/04111* (2013.01)

(58) Field of Classification Search
  CPC ........ G06F 3/044; G06F 3/0416; G06F 3/041; G06F 3/0418; G06F 3/0412; G06F 1/16;
  (Continued)

(56) References Cited

U.S. PATENT DOCUMENTS

| 4,087,625 A | 5/1978 | Dym et al. |
| 4,233,522 A | 11/1980 | Grummer et al. |

(Continued)

FOREIGN PATENT DOCUMENTS

| CN | 2436978 Y | 6/2001 |
| CN | 1490713 A | 4/2004 |

(Continued)

OTHER PUBLICATIONS

International Search Report and Written Opinion dated Jun. 16, 2015, Application No. PCT/US/2015/024495, Consists of 11 pages.

(Continued)

*Primary Examiner* — Jennifer Mehmood
*Assistant Examiner* — James Nokham
(74) *Attorney, Agent, or Firm* — Patterson + Sheridan, LLP

(57) ABSTRACT

Embodiments of the present invention generally provide an input device. The input device includes a first plurality of sensor electrodes disposed substantially parallel to each other and a second plurality of sensor electrodes disposed substantially perpendicular to the first plurality of sensor electrodes. An areal extent of the first and second sensor electrodes defines a sensor region. The input devices further includes a plurality of routing traces disposed within the sensor region of the input device. A first sensor electrode included in the first plurality of sensor electrodes is coupled to a first routing trace included in the plurality of routing traces, and the first routing trace is routed through a second sensor electrode included in the first plurality of sensor electrodes.

21 Claims, 20 Drawing Sheets

(58) Field of Classification Search
CPC ......... G06F 1/1643; G06F 2203/04111; G06F 2203/04103
USPC ................................ 345/173–174; 178/18.06
See application file for complete search history.

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Locales et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,237,453 B2 * | 8/2012 | Badaye ................. G06F 3/044 324/658 |
| 8,243,027 B2 | 8/2012 | Hotelling et al. |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Urn et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |

(56) References Cited

U.S. PATENT DOCUMENTS

| | | |
|---|---|---|
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0006347 A1 | 1/2010 | Yang |
| 2010/0013745 A1 | 1/2010 | Kim et al. |
| 2010/0013800 A1* | 1/2010 | Elias ............... G06F 3/0418 345/178 |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0147600 A1 | 6/2010 | Orsley |
| 2010/0149108 A1* | 6/2010 | Hotelling ............ G06F 3/044 345/173 |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0182275 A1* | 7/2010 | Saitou ............... G06F 3/044 345/174 |
| 2010/0188359 A1 | 7/2010 | Lee |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0018841 A1 | 1/2011 | Hristov |
| 2011/0022351 A1 | 1/2011 | Philipp et al. |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0134052 A1* | 6/2011 | Tsai ............... G06F 3/044 345/173 |
| 2011/0141051 A1 | 6/2011 | Ryu |
| 2011/0169770 A1 | 7/2011 | Mishina et al. |
| 2011/0169783 A1* | 7/2011 | Wang ............... G06F 3/0412 345/176 |
| 2011/0187666 A1 | 8/2011 | Min |
| 2011/0267300 A1 | 11/2011 | Serban et al. |
| 2011/0273391 A1 | 11/2011 | Bae |
| 2012/0044171 A1 | 2/2012 | Lee et al. |
| 2012/0044662 A1* | 2/2012 | Kim ............... G06F 3/0418 361/816 |
| 2012/0056820 A1 | 3/2012 | Corbridge |
| 2012/0262385 A1* | 10/2012 | Kim ............... G06F 3/044 345/173 |
| 2012/0313901 A1 | 12/2012 | Monson |
| 2012/0319966 A1 | 12/2012 | Reynolds |
| 2013/0113752 A1 | 5/2013 | Chang et al. |
| 2013/0181943 A1* | 7/2013 | Bulea ............... G06F 3/044 345/174 |
| 2013/0191804 A1 | 7/2013 | Bytheway et al. |
| 2014/0070875 A1 | 3/2014 | Dunphy et al. |
| 2014/0078097 A1* | 3/2014 | Shepelev ............ G06F 3/0412 345/174 |
| 2014/0078100 A1* | 3/2014 | Peng ............... G06F 3/041 345/174 |
| 2014/0168536 A1 | 6/2014 | Guo et al. |
| 2014/0191978 A1* | 7/2014 | Ng ............... G06F 3/044 345/173 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| KR | 101302634 B1 | 9/2013 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. " Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

(56) References Cited

OTHER PUBLICATIONS

Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
International Search Report, PCT/US2013/021314 dated Jun. 25, 2013.

\* cited by examiner

INPUT DEVICE HAVING A REDUCED BORDER REGION

CROSS-REFERENCE TO RELATED APPLICATIONS

This application claims benefit of U.S. provisional patent application Ser. No. 61/984,656, filed Apr. 25, 2014, which is hereby incorporated herein by reference.

BACKGROUND

Field

Embodiments of the present disclosure generally relate to capacitive sensors having improved response symmetry.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Conventional mutual capacitance proximity sensors typically include two kinds of electrodes—referred to as transmitter electrodes and receiver electrodes—running orthogonal to each other to form a matrix of unique transmitter-receiver intersections. Each electrode is electrically connected at two edges of the sensor area, necessitating a border width in which conductive routing traces are disposed.

The requirement of a border width in conventional proximity sensors prevents the active area of the proximity sensor and, in some cases, the viewable portion of the display device from extending to the edge of the input device. Additionally, signals transmitted through the conductive routing traces may couple to nearby sensor electrodes, creating an asymmetrical response at transmitter-receiver intersections that are located near the border width of the input device.

Therefore, there is a need for improved electrodes configurations for mutual capacitance proximity sensors.

SUMMARY

Embodiments of the present disclosure generally provide an input device. The input device includes a first plurality of sensor electrodes disposed substantially parallel to each other and a second plurality of sensor electrodes disposed substantially perpendicular to the first plurality of sensor electrodes. An areal extent of the first and second sensor electrodes defines a sensor region. The input devices further includes a plurality of routing traces disposed within the sensor region of the input device. A first sensor electrode included in the first plurality of sensor electrodes is coupled to a first routing trace included in the plurality of routing traces, and the first routing trace is routed through a second sensor electrode included in the first plurality of sensor electrodes.

Embodiments of the present disclosure may further provide an input device. The input device includes a first plurality of sensor electrodes disposed substantially parallel to each other and a second plurality of sensor electrodes disposed substantially perpendicular to the first plurality of sensor electrodes. An areal extent of the first and second sensor electrodes define a sensor region. The input device further includes a plurality of routing traces disposed within the sensor region of the input device. A first sensor electrode included in the first plurality of sensor electrodes is coupled to a first routing trace included in the plurality of routing traces, and the first routing trace is routed through a second sensor electrode included in the first plurality of sensor electrodes. The input device further includes a processing system coupled to the first plurality of sensor electrodes and the second plurality of sensor electrodes via the plurality of routing traces.

Embodiments of the present disclosure may further provide a method of input sensing with an input device. The method includes driving a first plurality of sensor electrodes disposed substantially parallel to each other for capacitive sensing. The method further includes receiving resulting signals from a second plurality of sensor electrodes disposed substantially perpendicular to the first plurality of sensor electrodes while the first plurality of sensor electrodes are being driven for capacitive sensing. The first and second sensor electrodes have an aerial extent defining a sensor region. The method further includes receiving, in a processing system, the resulting signals via a plurality of routing traces disposed within the sensor region and coupled to the second plurality of sensor electrodes. A first sensor electrode included in the first plurality of sensor electrodes is coupled to a first routing trace included in the plurality of routing traces, and the first routing trace is routed through a second sensor electrode included in the first plurality of sensor electrodes. The method further includes determining positional information based on the resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Various embodiments of the present technology generally provide sensor electrode configurations that enable routing traces to be routed through the sensor region of an input device instead of (or in addition to) disposing the routing traces along a border width of the input device. Further, one or more types of sensor electrodes may be routed through each other such that the number of routed traces disposed along the border width of the input device is reduced. In addition to reducing the border width of the input device, routing the sensor electrodes through a sensor region of an input device may improve capacitive response uniformity, such as by increasing geometrical and topological symmetry of the sensor electrodes. For example, reducing the number of routing traces that are routed along the border width of the input device may reduce or eliminate response non-uniformities experienced by capacitive pixels that are positioned near the border width.

Figure 1:
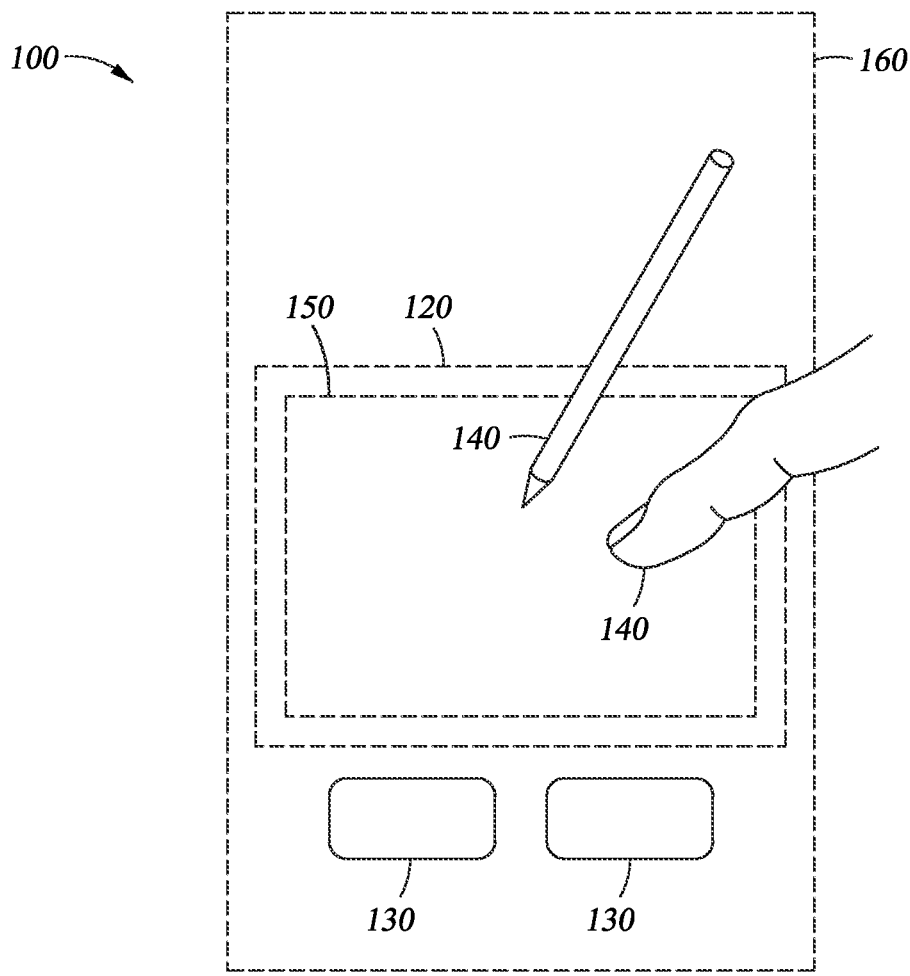
FIG. 1 is a block diagram of an exemplary input device in accordance with embodiments of the disclosure.

Turning now to the figures, FIG. 1 is a block diagram of an exemplary input device 100 in accordance with embodiments of the disclosure. In various embodiments, the input device 100 includes a display device 160 and a discrete sensing device, such as a capacitive sensing device. In other embodiments, the input device 100 includes a display device and a sensing device, such as a capacitive sensing device, that is at least partially integrated with the display device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and stylus, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO, carbon nanotubes, nanowires, metal mesh(es), graphene, or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
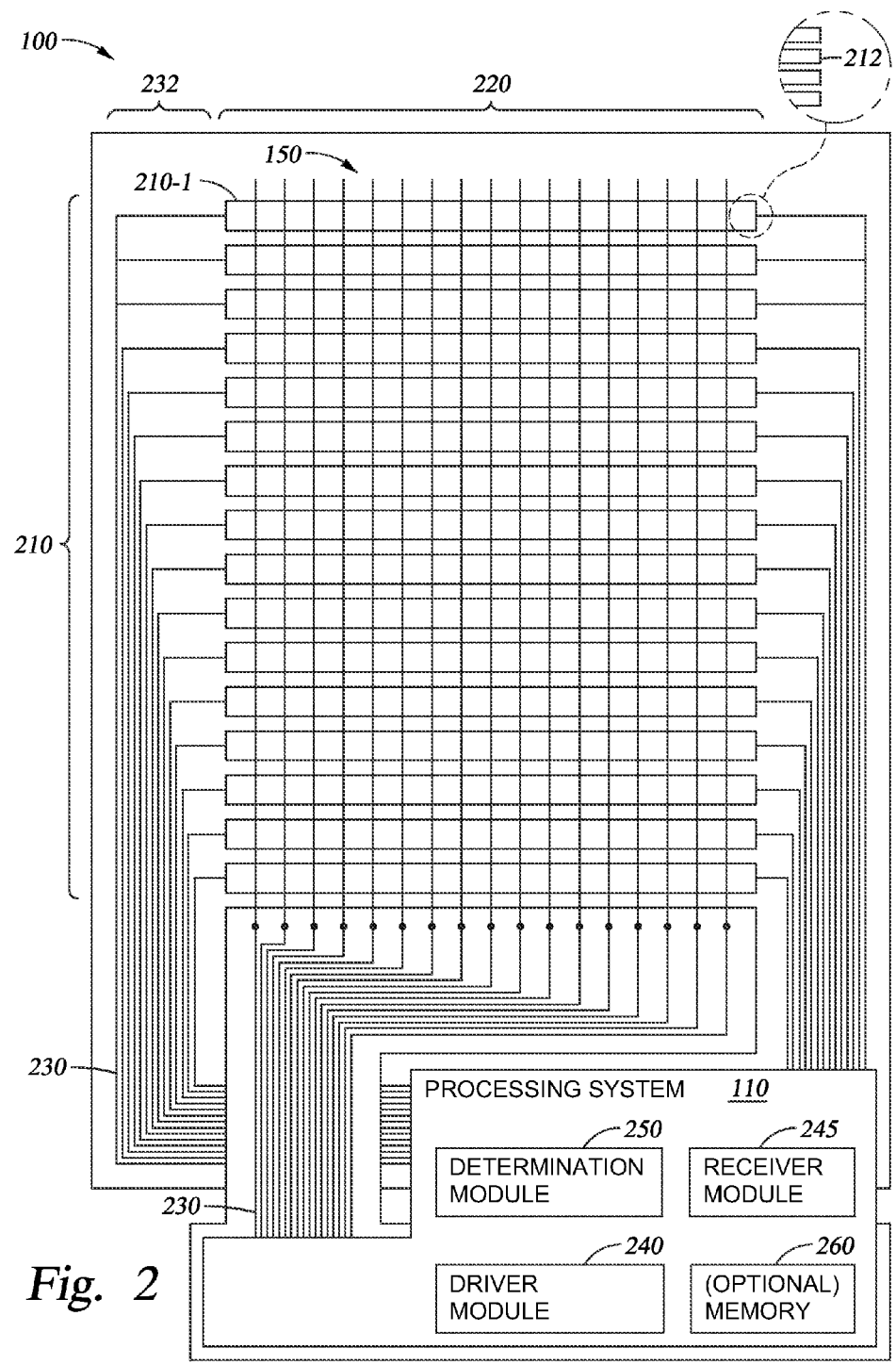
FIG. 2 is a partial schematic plan view of the input device of FIG. 1 in accordance with embodiments of the disclosure.

FIG. 2 is a partial schematic plan view of the input device 100 of FIG. 1 in accordance with embodiments of the disclosure. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes 212, such as one or more segments of a Vcom electrode, a source line, select line, an anode sub-pixel electrode, cathode pixel electrode, or any other display element that is used for both display updating and input sensing. Additionally, each receiver electrode 220 may comprise one or more common electrodes (e.g., gate select lines used for display updating). Further, both the transmitter electrodes 210 and the receiver electrodes 220 may include one or more common electrodes 212, such as common electrodes disposed on the TFT substrate and/or color filter glass. Although the transmitter electrodes 210 and receiver electrodes 220 are illustrated as being rectangular, in other embodiments, the transmitter electrodes 210 and receiver electrodes 220 may be any practical geometric shape. The processing system 110 is coupled to the array of sensing elements 150, for example, through one or more routing traces 230.

Although the processing system 110 is illustrated in FIG. 2 embodied as a single integrated circuit (IC) (e.g., an integrated controller), the processing system 110 may include any appropriate number of ICs. As shown in FIG. 2, the processing system 110 may include a driver module 240, a receiver module 245, a determination module 250, an optional memory 260, and/or a synchronization mechanism (not shown in FIG. 2).

The driver module 240 includes driver circuitry and may be configured for updating images on the display screen of the display device 160. For example, the driver circuitry may be configured to drive gate select lines and/or apply one or more pixel voltages to the display pixel electrodes through pixel source drivers. The driver circuitry may also be configured to apply one or more common drive voltages to the common electrodes 212 to update one or more display lines of the display screen. In addition, the processing system 110 may be configured to operate the common electrodes 212 as transmitter electrodes 210 for input sensing by driving transmitter signals onto the common electrodes 212.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In some embodiments, the receiver module 245 is configured to receive resulting signals while the processing system 110 is not actively transmitting input sensing signals with the transmitter electrodes 210. For example, during such time periods, the receiver electrodes 220 may be configured to receive noise (e.g., to determine a baseline interference value) and/or a signal from an active input object 140 capable of transmitting a transmitter signal, such as an active pen capable of transmitting an active pen signal. Additionally, the receiver module 245 and/or driver module 240 may be configured to drive a signal onto one or more sensing elements 150 to detect changes in capacitance (e.g., absolute capacitance or transcapacitance) of the sensing element 150 due to the presence of an input object 140.

The functions of the processing system 110 may be implemented in more than one IC to control elements of the display device 160 (e.g., common electrodes 212) and drive transmitter signals and/or receive resulting signals received from the array of sensing elements 150. For example, one IC may be configured to perform input sensing and another IC may be configured to perform display updating. In other embodiments, one IC may be configured to perform the functions of the driver module 240, and another IC may be configured to perform the functions of the receiver module 245. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include matrix sensors, the term "capacitive pixels" may refer to the localized capacitance (e.g., absolute capacitance) between a sensing element 150 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensing elements 150 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

As shown in FIG. 2, sensor electrodes (e.g., transmitter electrodes 210 and/or receiver electrodes 220) may be coupled to the processing system 110 via a plurality of routing traces 230 that are disposed in a border width 232 of the input device 100. The inclusion of a border width 232 in input device 100 prevents the sensing region 150 of the proximity sensor and—in embodiments in which common electrodes are used for both input sensing and displaying updating—the viewable portion of the display device 160 from extending to the edge of the input device 100. Additionally, signals transmitted through the routing traces 230 may couple to transmitter electrodes 210 and/or receiver electrodes 220, creating an asymmetrical response at capacitive pixels that are located near the border width 232 of the input device 100.

Accordingly, in various embodiments, the routing traces that couple the sensor electrodes to the processing system 110 may be disposed within the areal extent of the sensing elements 150 (referred to herein as the "sensor region"), instead of (or in addition to) disposing the routing traces in a border width 232 of the input device 100. Such embodiments are described below in further detail in conjunction with FIGS. 3-12.

Capacitive Sensors Having Symmetrical Response

Figure 3A:
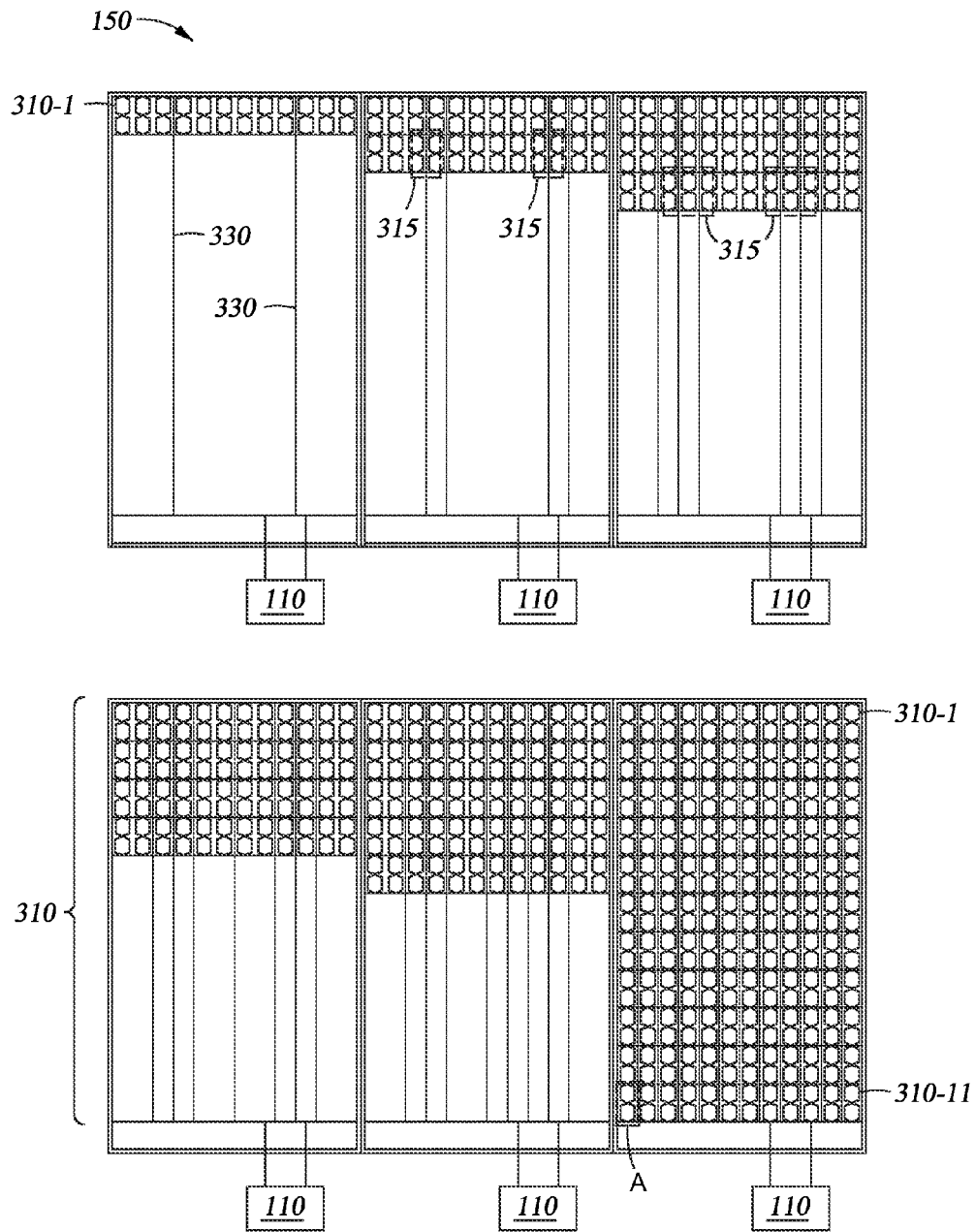
FIG. 3A illustrates a schematic plan view of transmitter electrodes included in the input device of FIG. 1, through which routing traces are routed in accordance with embodiments of the disclosure.

FIG. 3A illustrates a schematic plan view of transmitter electrodes 310 included in the input device 100 of FIG. 1, through which routing traces 330 are routed in accordance with embodiments of the disclosure. As shown, the routing traces 330 that couple the transmitter electrodes 310 to the processing system 110 may be disposed within the sensor region, decreasing the border width of the input device 100 and reducing the degree to which routing traces 330 asymmetrically affect the response of capacitive pixels included in the sensor region.

In some embodiments, the routing traces 330 are routed through one or more bypasses 315 included in the transmitter electrodes 310. For example, as shown in FIG. 3A, the routing traces 330 associated with transmitter electrode 310-1 may be routed through bypasses 315 included in transmitter electrodes 310-2 through 310-11. In such embodiments, the transmitter electrodes 310 (e.g., transmitter electrodes 310-2) and the routing traces 330 may be disposed on the same layers or different layers of the input device 100. For example, when the transmitter electrodes 310 and the routing traces 330 are disposed on the same layer of the input device 100, the transmitter electrodes 310 may be segmented at bypasses, which enable routing traces 330 to be routed through the transmitter electrodes 310. A given row of transmitter electrode segments may then be electrically coupled using jumpers to form a continuous transmitter electrode 310 along each row of the input device 100. In addition to electrically coupling separate transmitter electrode segments, the jumpers may electrically insulate the transmitter electrodes 310 from routing trace(s) 330 that are routed through the transmitter electrode 310, as described in further detail in conjunction with FIGS. 4A and 4B.

In other embodiments, the transmitter electrodes 310 may be disposed on a first layer of the input device 100, and the routing traces 330 may be disposed on a second layer of the input device. The routing traces 330 may then be electrically coupled to the transmitter electrodes 310 using one or more through-substrate vias. In such embodiments, the first layer and second layer may correspond to two sides of a single substrate, or the first layer and second layer may be associated with different substrates.

In the embodiment shown in FIG. 3A, more than half of the length of the perimeter of the input device is free of routing traces. That is, in contrast to conventional input device designs, the routing traces 330 extend along less than half of the perimeter of the input device 100. For example, the top edge of the input device 100 is free of routing traces, and more than 80% of the length of the left edge and the right edge of the input device 100 are free of routing traces, enabling the border width to be reduced, and reducing the degree to which the routing traces produce asymmetrical responses in capacitive pixels along the edges of the input device 100. Additionally, in other embodiments, the top edge, left edge, and right edge of the input device 100 may be entirely free of routing of traces, for example, by increasing the number of bypasses 315 that are present in the sensor region. For example, with reference to FIG. 3A, increasing the number of bypasses 315 included in the sensor region (e.g., by increasing the number of transmitter electrode segments associated with each transmitter electrode 310) may enable the routing traces 330 associated with transmitter electrodes 310-10 and 310-11 to be routed through the sensor region, instead of along the bottom left edge and bottom right edge of the input device 100. Thus, in such embodiments, no routing traces are routed along the edge of the input device 100.

Figure 3B:
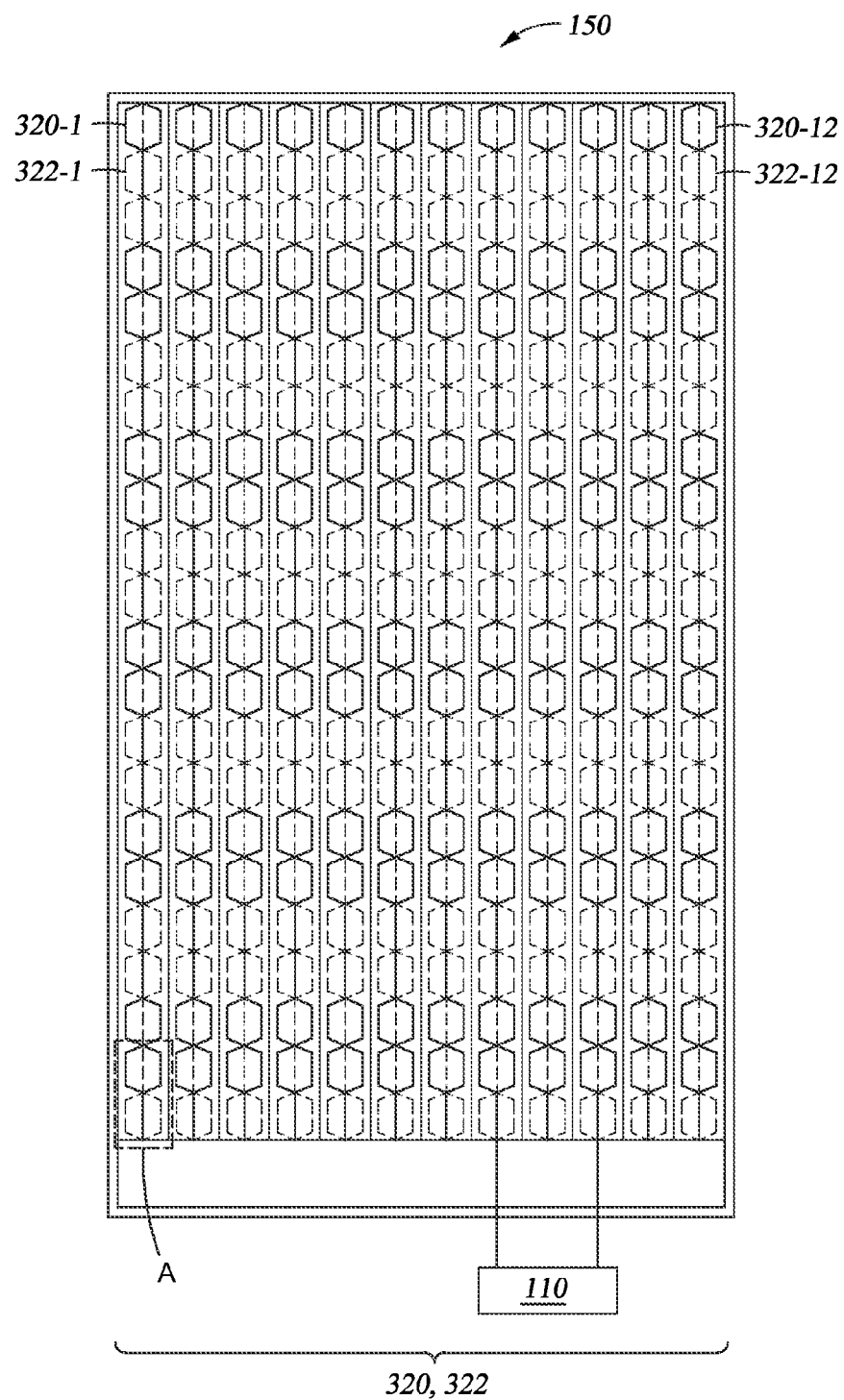
FIG. 3B illustrates a schematic plan view of receiver electrodes included in the input device of FIG. 1 in accordance with embodiments of the disclosure.

FIG. 3B illustrates a schematic plan view of receiver electrodes 320, 322 included in the input device 100 of FIG. 1, in accordance with embodiments of the disclosure. As shown, each receiver electrode 320 (e.g., receiver electrode 320-1) may be routed through a receiver electrode 322 (e.g., receiver electrode 322-1) such that both receiver electrodes 320 and receiver electrodes 322 extend along the same column of the input device 100. As shown in further detail in FIG. 4A, routing the receiver electrodes 320, 322 through one another in a given column of the input device 100 enables input sensing to be performed using two capacitive pixels for each transmitter electrode 310 intersected by the column. Additionally, in such configurations, substantial topological and geometrical symmetry is maintained relative to the transmitter electrodes 310.

Figure 4A:
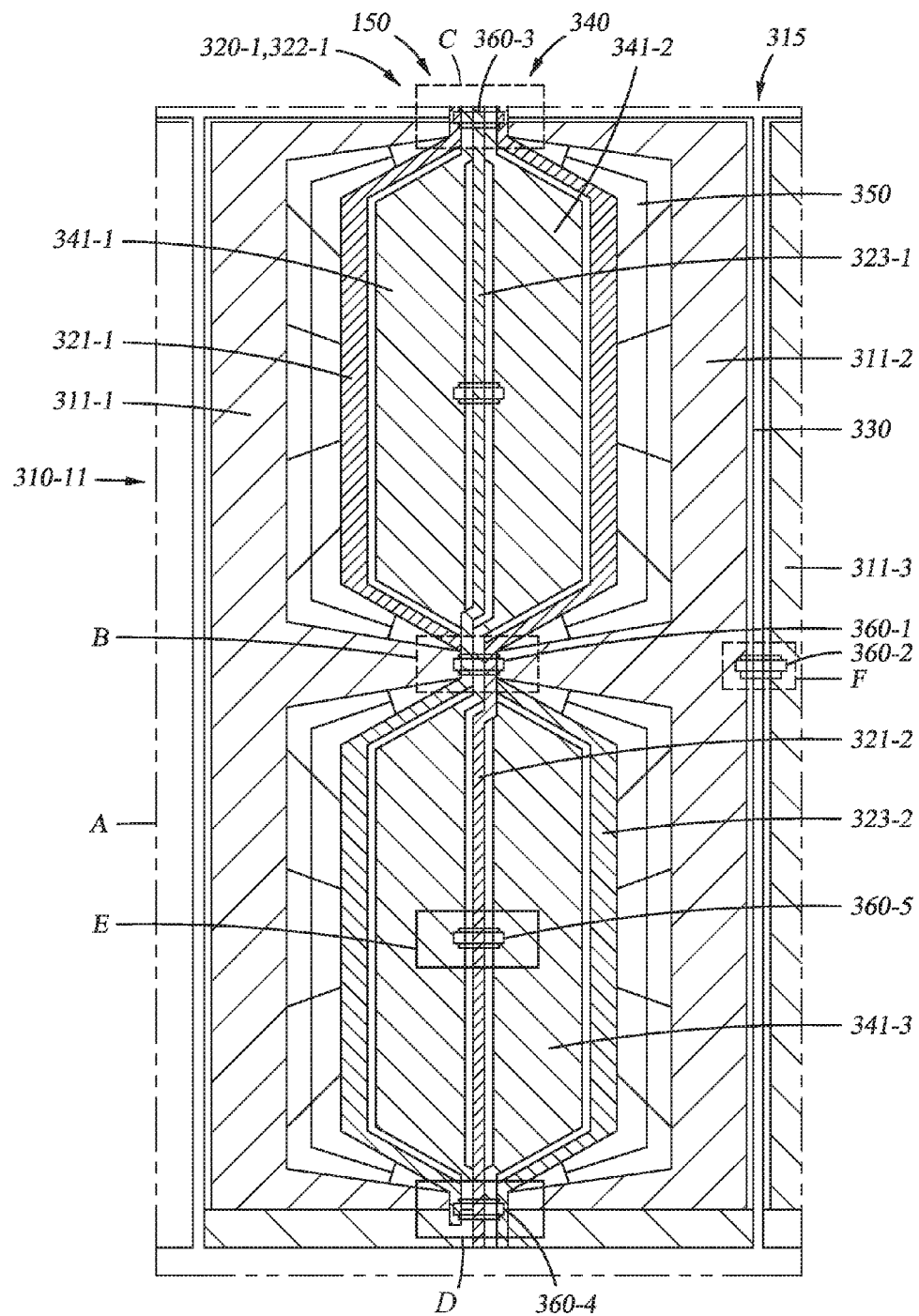
FIG. 4A illustrates a partial schematic plan view of the sensing elements of FIGS. 3A and 3B in accordance with embodiments of the disclosure.
Figure 4B:
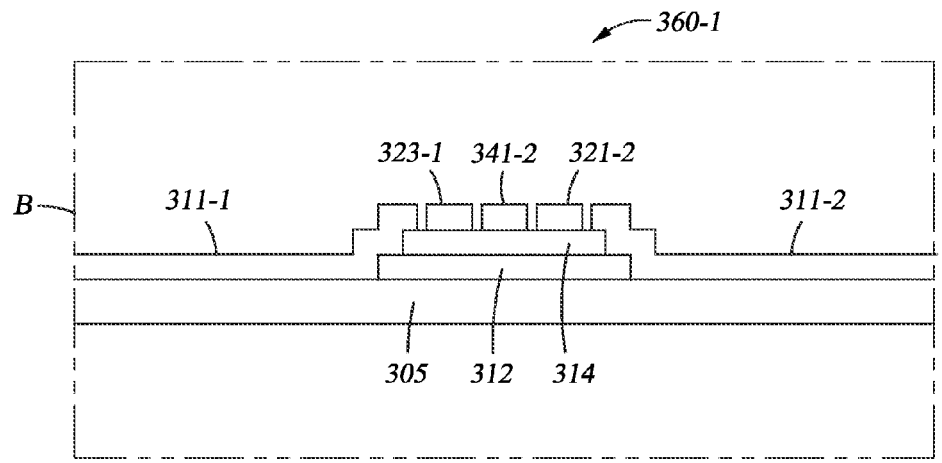
FIGS. 4B-4F illustrate jumpers that provide electrical connections between segments of the sensing elements of FIGS. 3A and 3B in accordance with embodiments of the disclosure.

FIG. 4A illustrates a partial schematic plan view of the sensing elements 150 of FIGS. 3A and 3B in accordance with embodiments of the disclosure. As shown, the sensing elements 150 may include transmitter electrode segments 311-1, 311-2 and 311-3, receiver electrode segments 321-1 and 321-2, receiver electrode segments 323-1 and 323-2, and ground electrode segments 341-1, 341-2, and 341-3. The transmitter electrode segments 311-1, 311-2, and 311-3 are electrically coupled by jumpers 360-1 and 360-2 to form transmitter electrode 310-11. Specifically, each of transmitter electrode segments 311-1, 311-2, 311-3, etc., included in the corresponding row of the input device 100 may be coupled to form transmitter electrode 310-11 using jumpers 360 that extend over and/or pass underneath the receiver electrodes 320, 322, routing traces 330, ground electrodes 340, etc. For example, jumper 360-1 extends across receiver electrode 322-1, ground electrode 340, and receiver electrode 320-1, as shown in FIG. 4B. Thus, jumper 360-1 may provide electrical connectivity between transmitter electrode segments 311-1 and 311-2 while also insulating the transmitter electrode 310-11 from receiver electrode 322-1, ground electrode 340, and receiver electrode 320-1. In addition, jumper 360-2 extends across a bypass 315 through which a routing trace 330 associated with transmitter electrode 310-8 is routed. Thus, jumper 360-2 may provide electrical connectivity between transmitter electrode segments 311-2 and 311-3 while also insulating the transmitter electrode 310-11 from the routing trace 330 that electrically couples transmitter electrode 310-8 to the processing system 110.

Additionally, the receiver electrode segments 321-1 and 321-2 are electrically coupled by a jumper 360-3 to form receiver electrode 320-1, the receiver electrode segments 323-1 and 323-2 are electrically coupled by a jumper 360-4 to form receiver electrode 322-1, and the ground electrode segments 341-1, 341-2, and 341-3 are electrically coupled by a jumper 360-5 to form a ground electrode 340 (e.g., ground electrode 340-1). Cross-sectional views of the connectivity provided by jumpers 360-3, 360-4, and 360-5 is discussed in further detail in conjunction with FIGS. 4C-4F, respectively.

In various embodiments, the sensing elements 150 shown in FIG. 4A may be composed of a transparent conductive oxide (TCO), such as indium tin oxide (ITO), or any other substantially transparent material, including carbon nanotubes, nanowires, metal mesh(es), and/or graphene structures. Accordingly, in order to maintain uniformity with respect to the light transmissivity, index of refraction, etc. of the substrate, "dummy" electrodes 350 may be disposed in unused areas of the sensor region. These dummy electrodes 350 are not coupled to the processing system 110 and merely provide the substrate with a more uniform optical appearance, such as when the substrate is to be overlaid and/or integrated with a display device to form a touchscreen device.

A ground electrode 340 may disposed between receiver electrode 320 and receiver electrode 322 in order to shield the receiver electrodes 320, 322 from one another and/or from one or more transmitter electrodes 310. For example, one or more ground electrode segments 341 may be disposed between the receiver electrode 320 and receiver electrode 322 in order to control which receiver electrode 320, 322 is receiving input sensing signals transmitted by a transmitter electrode 310, and/or to control which receiver electrode 320, 322 is receiving input sensing signals at a given location on a transmitter electrode 310. For example, as shown in the upper portion of FIG. 4A, ground electrode segments 341-1 and 341-2 are disposed between receiver electrode 320-1 and receiver electrode 322-1 to reduce the degree to which receiver electrode 322-1 receives input sensing signals from transmitter electrode 310-11. Additionally, as shown in the lower portion of FIG. 4A, ground electrode segments 341-2 and 341-3 are disposed between receiver electrode 320-1 and receiver electrode 322-1 to reduce the degree to which receiver electrode 320-1 receives input sensing signals from transmitter electrode 310-11. As such, receiver electrode 320-1 is configured to receive resulting signals for the top portion (e.g., top capacitive pixel) of the transmitter electrode 310-11 shown in FIG. 4A, and receiver electrode 322-1 is configured to receive resulting signals for the bottom portion (e.g., bottom capacitive pixel) of the transmitter electrode 310-11 shown in FIG. 4A.

In other embodiments, the ground electrodes 340 may be used to perform input sensing, such as proximity sensing. For example, the ground electrodes 340 may be used to sense a hovering input object 140 (e.g., an input object 140 that is not in contact with the surface of the input device 100), such as by holding the ground electrodes 340 at a substantially constant voltage and measuring the amount of charge that must be added to and/or subtracted from the ground electrodes 340 in order to maintain that voltage. In such embodiments, the ground electrodes 340 may still provide sufficient isolation between the receiver electrodes 320, 322 and the transmitter electrode 310. In other embodiments, the ground electrodes 340 may be adapted to perform proximity sensing (e.g., hover sensing) and may no longer be configured to provide isolation between the receiver electrodes 320, 322 and the transmitter electrodes 310.

FIGS. 4B-4F illustrate jumpers 360 that provide electrical connections between segments of the sensing elements 150 of FIGS. 3A and 3B in accordance with embodiments of the disclosure. As shown in FIG. 4B, jumper 360-1 extends across receiver electrode segment 323-1, ground electrode segment 341-2, and receiver electrode segment 321-2 and provides electrical connectivity between transmitter electrode segments 311-1 and 311-2 via a conductive bridge 312, such as a conductive wire, a carbon nanotube bridge, nanowire bridge, TCO bridge, etc., disposed on the substrate 305. Additionally, transmitter electrode 310-11 is insulated from receiver electrode 322-1, ground electrode 340, and receiver electrode 320-1 by an insulator 314, such as a transparent insulator. In other embodiments, receiver electrode segment 323-1, ground electrode segment 341-2, and receiver electrode segment 321-2 may pass underneath the conductive bridge 312 and/or may be disposed on a different layer than the transmitter electrode 310-11 and/or conductive bridge 312. More generally, in each of FIGS. 4B-4F, the locations and orientations of any of the electrodes, routing traces, conductive bridges, insulators, etc. with respect to one another—such as whether a particular component is routed over another component, routed underneath the component, etc.—may be modified in various embodiments.

Figure 4C:
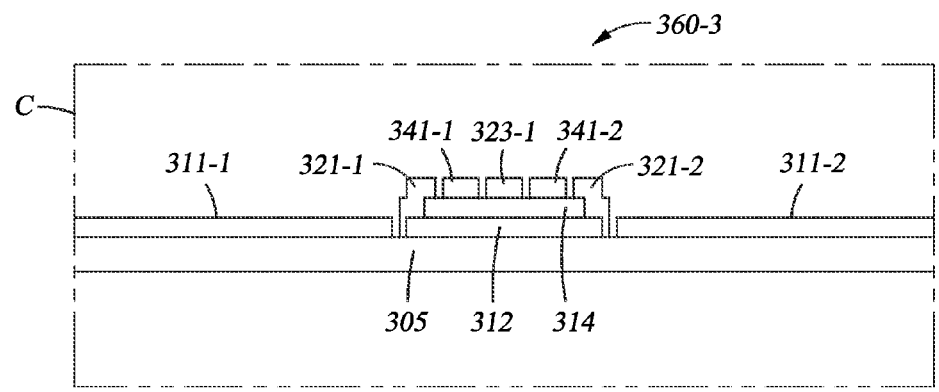
Figure 4D:
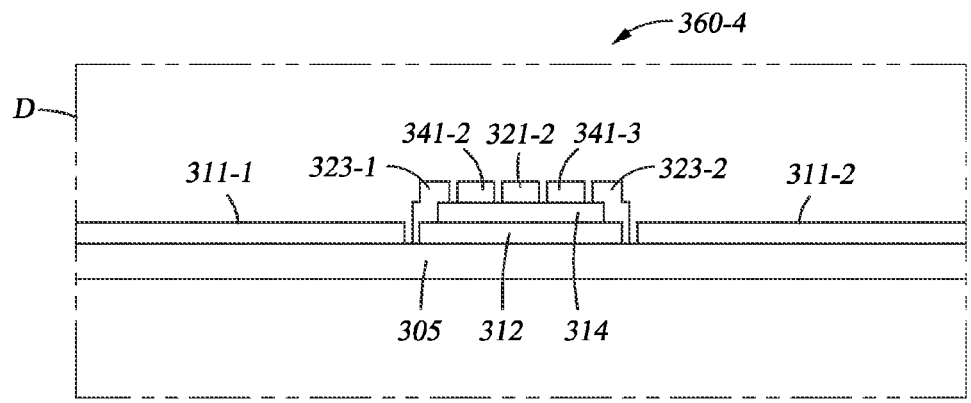
Figure 4E:
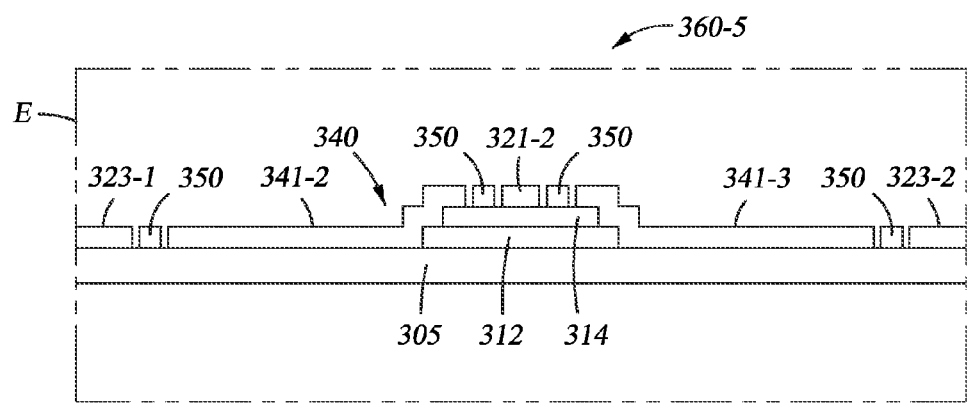
Figure 4F:
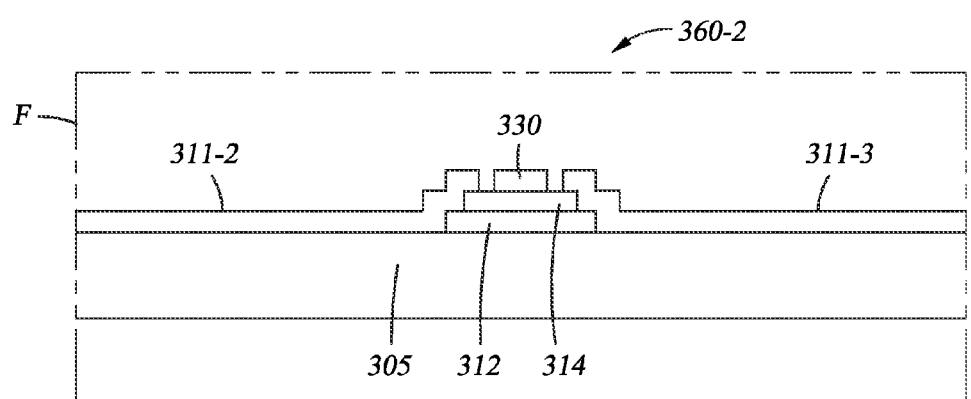

With reference to FIG. 4C, jumper 360-3 extends across ground electrode segments 341-1, 341-2 and receiver electrode segment 323-1 and provides electrical connectivity between receiver electrode segments 321-1 and 321-2 via a conductive bridge 312 disposed on the substrate 305. Additionally, receiver electrode 320-1 is insulated from ground electrode 340 and receiver electrode 322-1 by an insulator 314. With reference to FIG. 4D, jumper 360-4 extends across ground electrode segments 341-2, 341-3 and receiver electrode segment 321-2, providing electrical connectivity between receiver electrode segments 323-1 and 323-2 while insulating the receiver electrode 322-1 from ground electrode 340 and receiver electrode 320-1. With reference to FIG. 4E, jumper 360-5 extends across dummy electrodes 350 and receiver electrode segment 321-2, providing electrical connectivity between ground electrode segments 341-2 and 341-3 while insulating the ground electrode 340 from dummy electrodes 350 and receiver electrode 320-1. With reference to FIG. 4F, jumper 360-2 extends across a routing trace 330 associated with transmitter electrode 310-8, providing electrical connectivity between ground transmitter electrode segments 311-2 and 311-3 while insulating the transmitter electrode 310-11 from the routing trace 330.

Figure 5A:
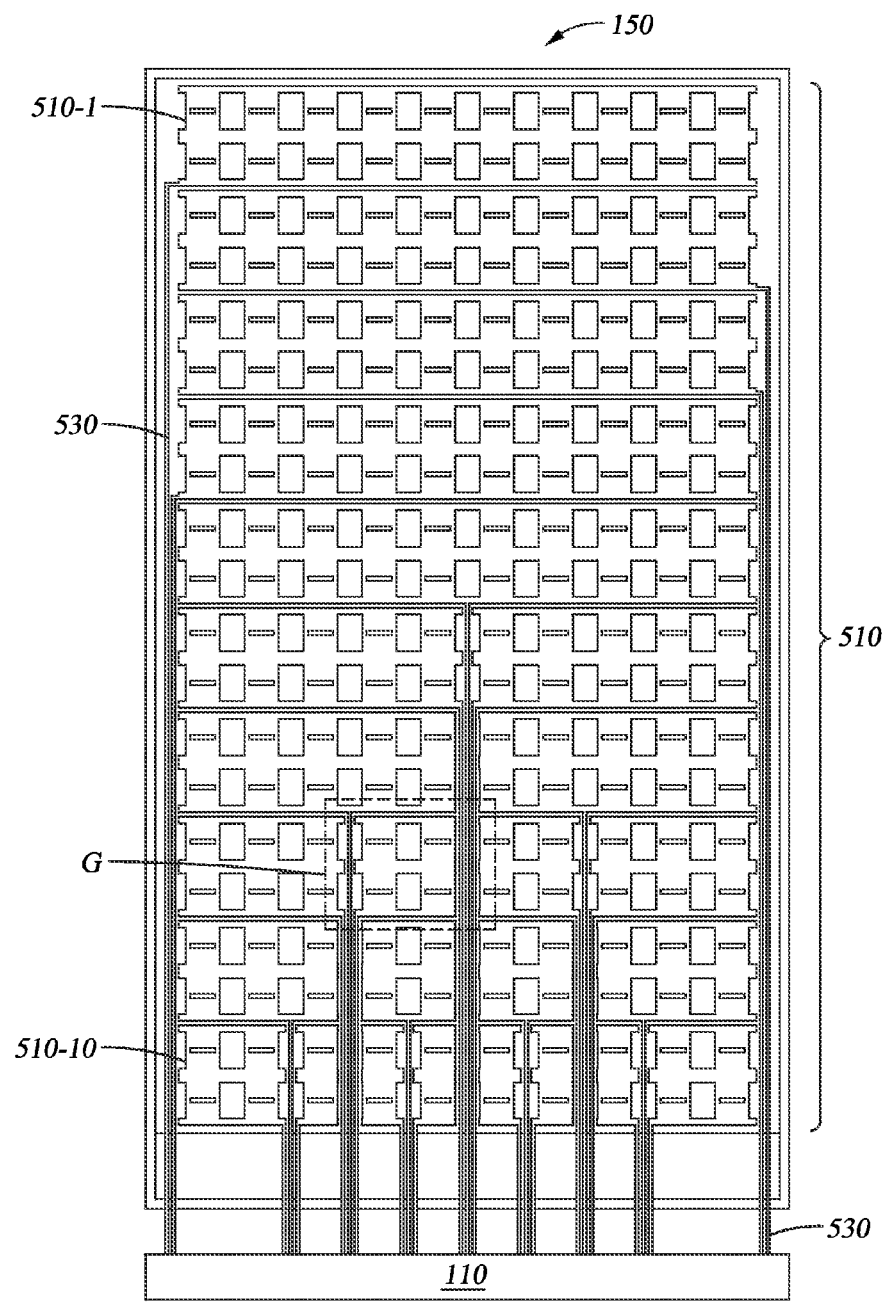
FIG. 5A illustrates a schematic plan view of transmitter electrodes included in the input device of FIG. 1, through a portion of which routing traces are routed in accordance with embodiments of the disclosure.

FIG. 5A illustrates a schematic plan view of transmitter electrodes 510 included in the input device 100 of FIG. 1, through a portion of which routing traces 530 are routed in accordance with embodiments of the disclosure. As shown, one or more of the routing traces 530 that couple the transmitter electrodes 510 (e.g., to the processing system 110 may be disposed within the sensor region, and one or more of the routing traces 530 may be disposed along the edge of the input device 100. In some embodiments, this configuration enables transmitter electrodes 510 to be disposed on a substrate via a reduced number of processing steps while also decreasing the border width of the input device 100 and reducing the degree to which the routing traces 530 asymmetrically affect the response of capacitive pixels included in the sensor region. For example, in some embodiments, the transmitter electrodes 510 and the associated routing traces 530 may be disposed on the substrate via a single patterning procedure (e.g., deposition and etching, deposition and lift-off, etc.) without needing to later fabricate jumpers to electrically couple disparate transmitter electrode segments through which routing traces are routed.

As shown in FIG. 5A, the routing traces 530 that electrically couple the processing system 110 to transmitter electrodes 510-1 through 510-4 are disposed along either the left edge or the right edge of the input device 100. By contrast, the routing traces that electrically couple the processing system 110 to transmitter electrodes 510-5 through 510-9 are routed through one or more of transmitter electrodes 510-6 through 510-10. For example, the routing traces 530 that couple transmitter electrode 510-6 to the processing system 110 are routed through transmitter electrodes 510-7 through 510-10. Moreover, the routing traces 530 associated with each of transmitter electrodes 510-5 through 510-9 are routed through transmitter electrode 510-10. Thus, in some embodiments, transmitter electrode 510-10 may be electrically coupled to the processing system 110 using eight separate routing traces 530.

Figure 5B:
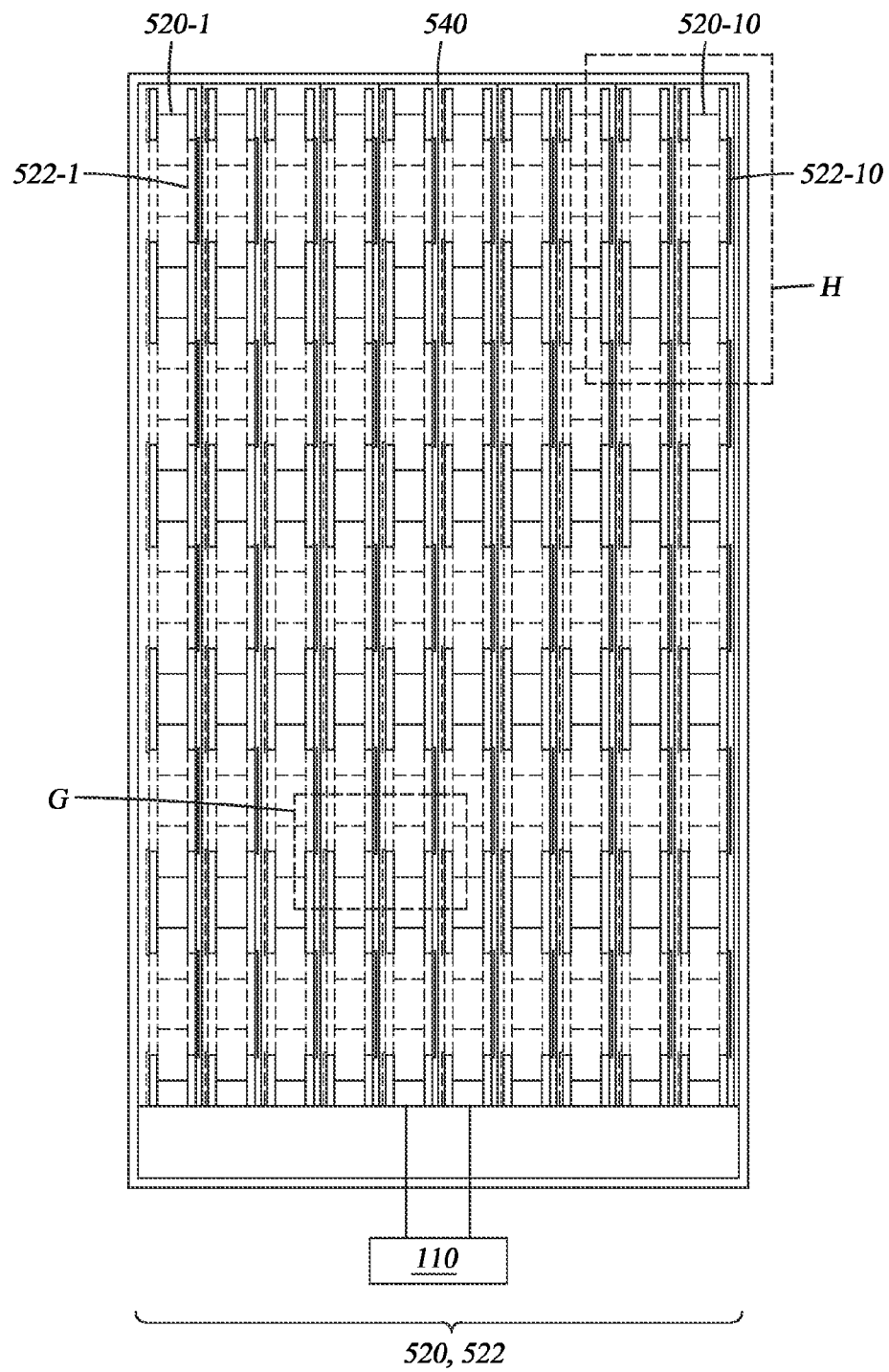
FIGS. 5B and 5C illustrate schematic plan views of receiver electrodes included in the input device of FIG. 1 in accordance with embodiments of the disclosure.
Figure 5C:
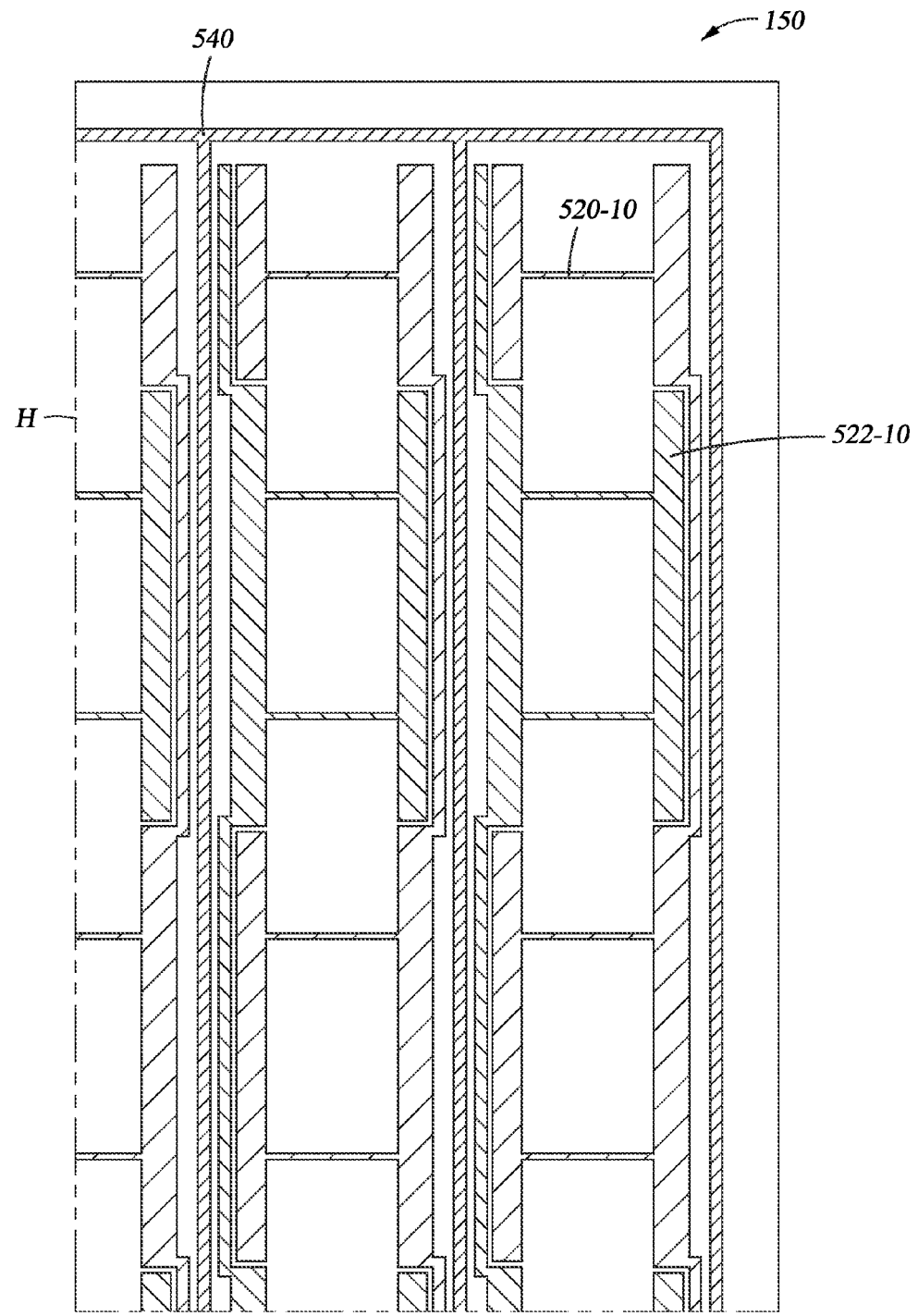

FIGS. 5B and 5C illustrate schematic plan views of receiver electrodes 520, 522 included in the input device 100 of FIG. 1, in accordance with embodiments of the disclosure. As shown, each receiver electrode 520 (e.g., receiver electrode 520-1) may be routed proximate to a receiver electrode 522 (e.g., receiver electrode 522-1) such that both receiver electrodes 520 and receiver electrodes 522 extend along the same column of the input device 100. Further, routing the receiver electrodes 520, 522 proximate to one another along a given column of the input device 100—in the alternating manner shown in FIGS. 5B and 6—enables input sensing to be performed using two capacitive pixels for each transmitter electrode 510 intersected by the column. Additionally, this configuration enhances the topological symmetry and geometrical symmetry of the receiver electrode 520, 522 with respect to the transmitter electrodes 310, as compared to conventional electrode configurations.

Ground electrodes 540 may further be disposed between the receiver electrodes 520, 522—on the same layer as the receiver electrodes 520, 522 or on a different layer than the receiver electrodes 520, 522—in order to shield the receiver electrodes 520, 522 from routing traces 530 associated with the transmitter electrodes 510. In some embodiments, the receiver electrodes 520, 522 may be disposed on a first layer of a substrate, and the transmitter electrodes 510 may be disposed on a second layer of the same substrate or a different substrate.

Figure 6A:
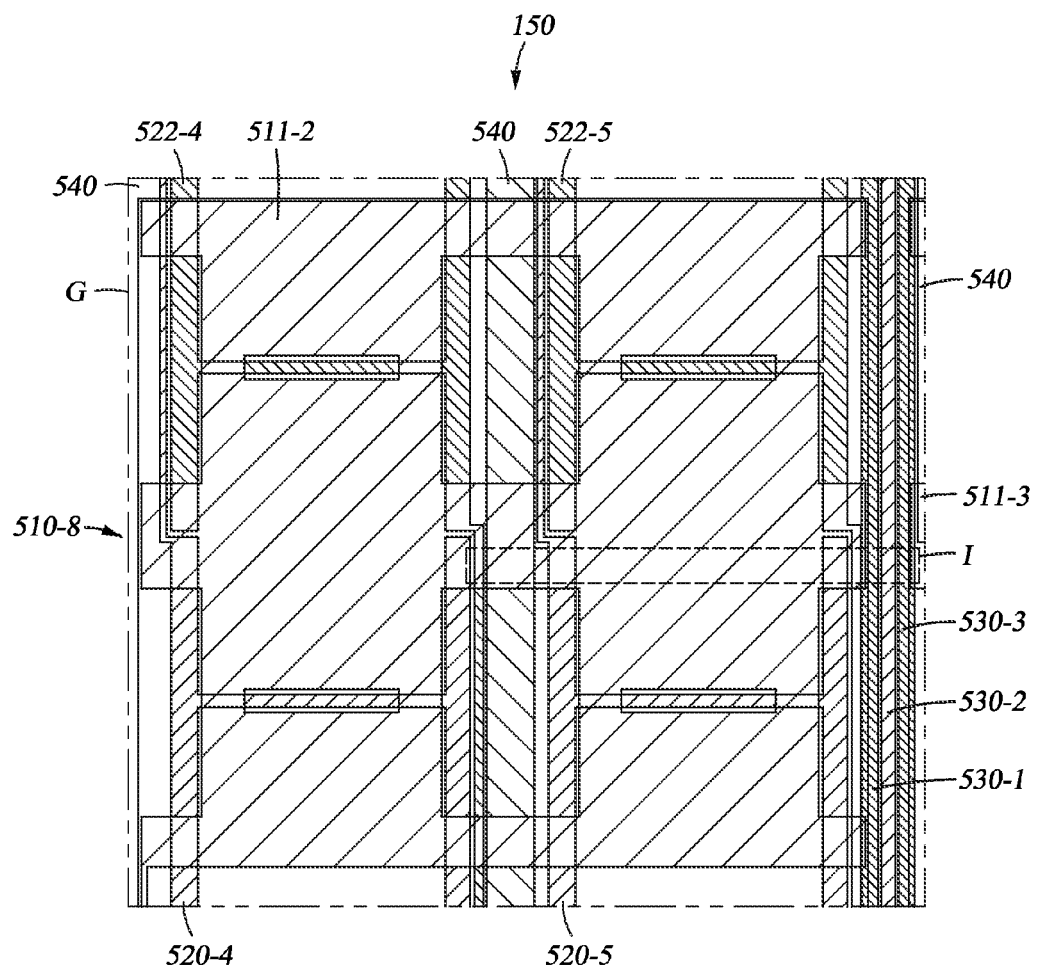
FIG. 6A illustrates a partial schematic plan view of the sensing elements of FIGS. 5A and 5B in accordance with embodiments of the disclosure.
Figure 6B:
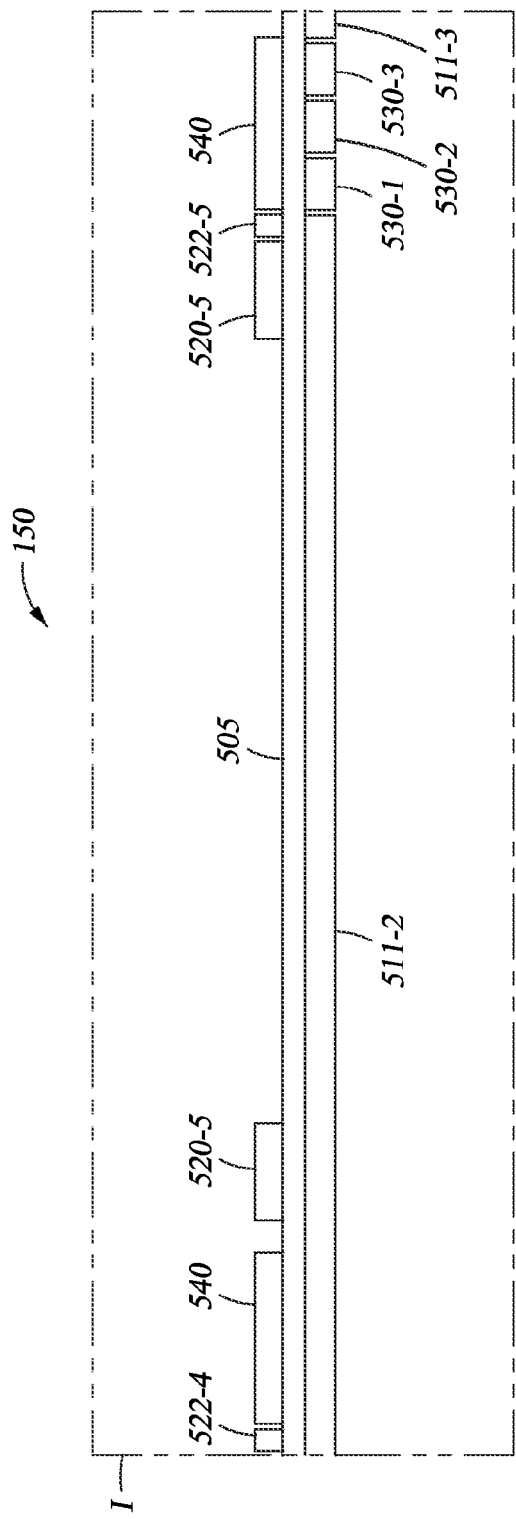
FIG. 6B illustrates a partial cross-sectional view of the sensing elements of FIGS. 5A and 5B in accordance with embodiments of the disclosure.

FIG. 6A illustrates a partial schematic plan view of the sensing elements 150 of FIGS. 5A and 5B in accordance with embodiments of the disclosure. FIG. 6B illustrates a partial cross-sectional view of the sensing elements 150 of FIGS. 5A and 5B in accordance with embodiments of the disclosure. As shown, the sensing elements 150 may include transmitter electrode segments 511-2 and 511-3, receiver electrodes 520-4, 522-4, 520-5, 522-5, and ground electrodes 540 disposed on two sides of a substrate 505. In order to route one or more routing traces 530 in the sensor region of the input device 100, one or more of the transmitter electrodes 510 may be segmented. For example, as shown, the routing trace 530-2 associated with transmitter electrode 510-5 and the routing traces 530-1 and 530-3 associated with transmitter electrode 510-6 are routed through transmitter electrode 510-8. As such, each of the transmitter electrode segments 511-2 and 511-3, as well as transmitter electrode segments 511-1 and 511-4 (not shown in FIGS. 6A and 6B), associated with transmitter electrode 510-8 are electrically coupled to the processing system 110 using separate routing traces 530.

The shape of each receiver electrode 520 and receiver electrode 522 may be varied along the length of the sensor region such that two capacitive pixels—one associated with a receiver electrode 520 and one associated with a receiver electrode 522—are acquired for each intersection between a column of receiver electrodes 520, 522 and a transmitter electrode 510. For example, as shown in FIG. 6A, receiver electrodes 522-4 and 522-5 may have a reduced width near the lower portion of the transmitter electrode 510-8 in order to enable receiver electrodes 520-4 and 520-5 to receive resulting signals in this region and to reduce the degree to which receiver electrodes 522-4 and 522-5 receive resulting signals. In addition, receiver electrodes 520-4 and 520-5 may have a reduced width near the upper portion of the transmitter electrode 510-8 in order to enable receiver electrodes 522-4 and 522-5 to receive resulting signals in this region and to reduce the degree to which receiver electrodes 520-4 and 520-5 receive resulting signals. Accordingly, four distinct capacitive pixels may be acquired in the sensor region shown in FIG. 6A.

Figure 7A:
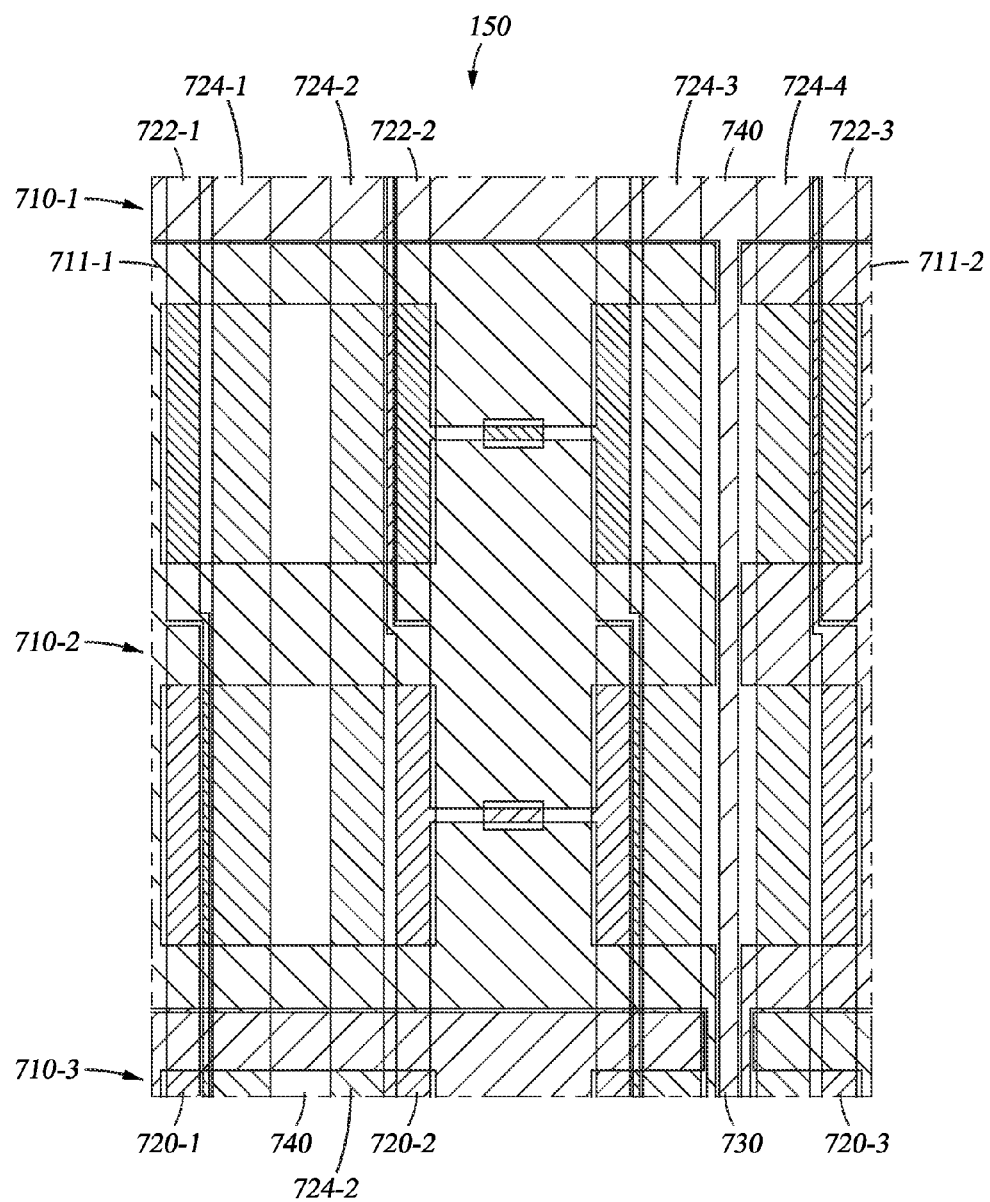
FIG. 7A illustrates a partial schematic plan view of sensing elements included in the input device of FIG. 1 in accordance with embodiments of the disclosure.
Figure 7B:
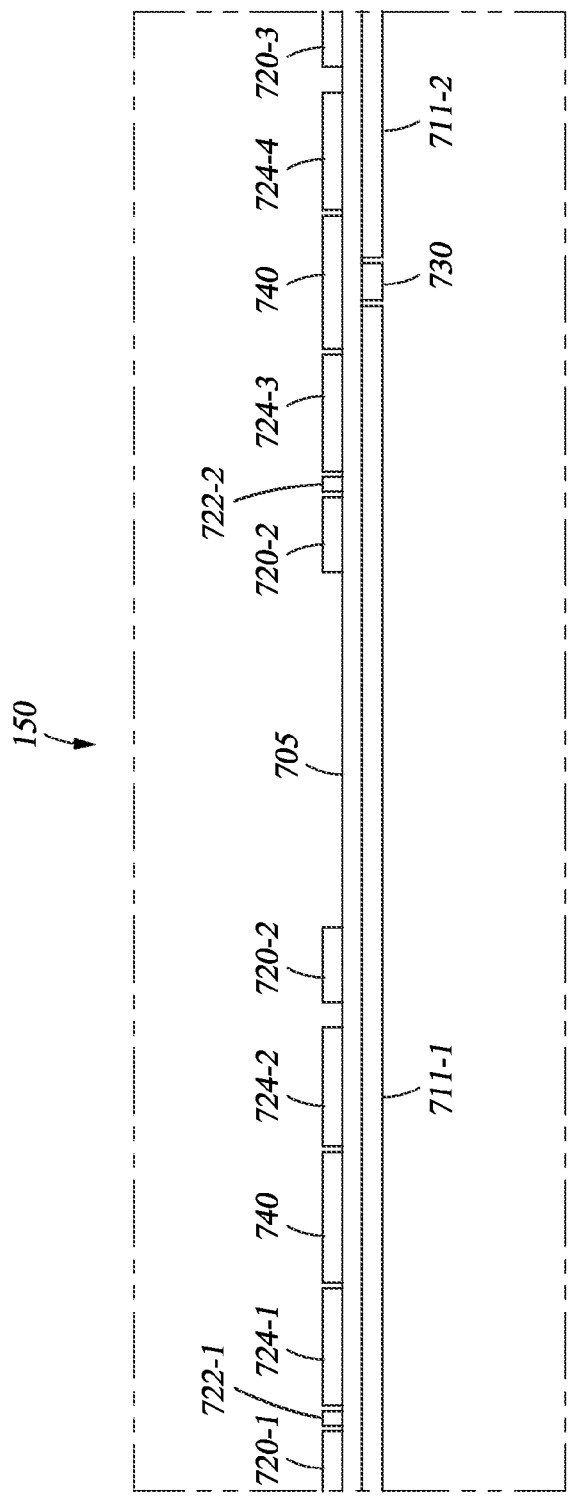
FIG. 7B illustrates a partial cross-sectional view of the sensing elements of FIG. 7A in accordance with embodiments of the disclosure.

FIG. 7A illustrates a partial schematic plan view of sensing elements 150 included in the input device 100 of FIG. 1 in accordance with embodiments of the disclosure. FIG. 7B illustrates a partial cross-sectional view of the sensing elements 150 of FIG. 7A accordance with embodiments of the disclosure. As shown, the sensing elements 150 may include transmitter electrodes 710-1, 710-2, and 710-3, receiver electrodes 720-1, 722-1, 720-2, 722-2, 720-3, and 722-3, hover electrodes 724-1, 724-2, 724-3, and 724-4, and ground electrodes 740 disposed on substrate 705. In contrast to the configuration shown in FIGS. 6A and 6B, the width of the receiver electrodes 720, 722 has been modified to allow hover electrodes 724 to be present between each column of receiver electrodes 720, 722. As such, the sensing elements 150 may be configured to detect both touch and hover input associated with an input object 140 in the sensing region 120 of the input device 100. Additionally, as described above, the transmitter electrodes 710, routing traces 730, and receiver electrodes 720, 722 may be disposed on each side of the substrate via a single patterning procedure without needing to later fabricate jumpers to electrically couple disparate electrode segments.

Figure 8:
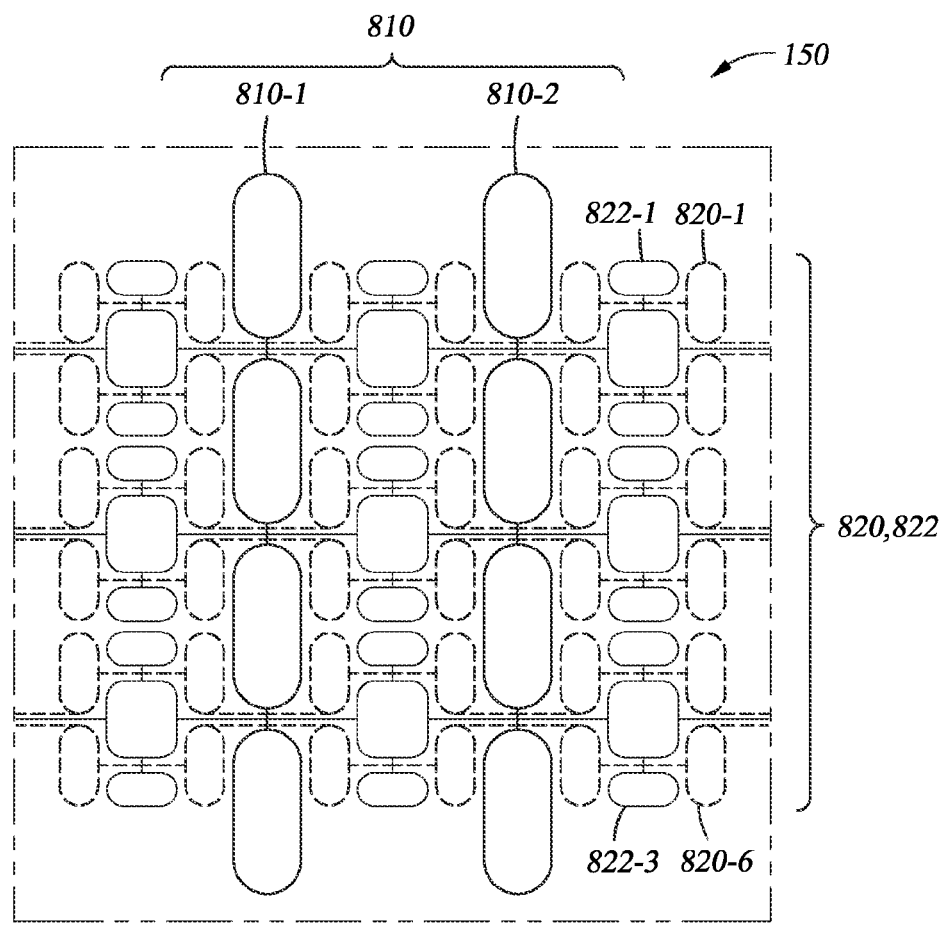
FIGS. 8 and 9 illustrate partial schematic plan views of sensing elements included in the input device of FIG. 1 in which multiple electrodes cross each other along the same axis in accordance with embodiments of the disclosure.
Figure 9:
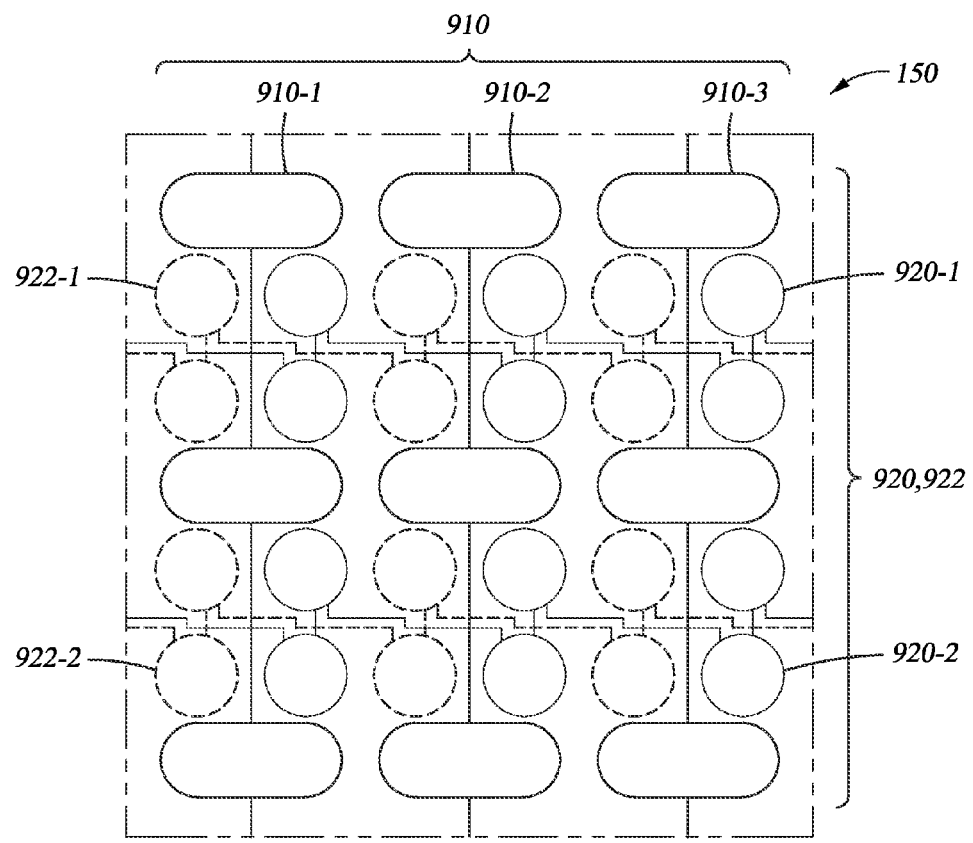

FIGS. 8 and 9 illustrate partial schematic plan views of sensing elements 150 included in the input device 100 of FIG. 1 in which multiple sensor electrodes cross each other along the same axis in accordance with embodiments of the disclosure. In FIG. 8, sensor electrodes 810 traverse a vertical axis, and sensor electrodes 820, 822 traverse a horizontal axis. Sensor electrodes 820, 822 are routed through each other in order to achieve a symmetrical response of sensor electrodes 820 with respect to sensor electrodes 810, despite topological asymmetry caused by the absence of a sensor electrode 822 in-between each sensor electrode 820. In some embodiments, sensor electrodes 820 and sensor electrodes 822 perform different types of sensing and, thus, possess different geometries. For example, sensor electrodes 820 may be used to detect input objects 140 that are in contact with a surface of the input device 100, and sensor electrodes 822 may be used for proximity sensing to detect input objects 140 that are hovering over, but not in contact with, a surface of the input device 100. In various embodiments, the routing traces that couple sensor electrodes 810, 820, 822 to the processing system 110 may be routed through the sensor region (e.g., through bypasses), as discussed above. Additionally, the sensor electrodes 810, 820, 822 may be routed through each other such that all of the sensor electrodes 810, 820, 822 are routed along the same side of the input device 100 (e.g., all of the routing traces are disposed along a single side of the input device 100).

In FIG. 9, sensor electrodes 910 traverse a vertical axis, and sensor electrodes 920, 922 traverse a horizontal axis. Sensor electrodes 920, 922 are routed through each other in order to achieve a symmetrical response of the sensor electrodes 920, 922 with respect to sensor electrodes 910. A symmetrical response may be achieved despite topological asymmetry created by the routing traces of the sensor electrodes 920, 922, which are disposed between the sensor electrodes 920, 922, away from sensor electrodes 910. Sensor electrodes 920, 922 possess equivalent geometry and alternate to define two columns for each sensor electrode 910, which, in effect, halves the number of sensor electrodes 910 that are used. Such configurations may enable a reduced border width, faster capacitive frame scan rates (e.g., when sensor electrodes 910 are configured as transmitters in a mutual capacitance sensing configuration), and lower power/die consumption (e.g., when sensor electrodes 910 are configured as receivers in a mutual capacitance sensing configuration). Additionally, the sensor electrodes 910, 920, 922 may be routed through each other such that all of the sensor electrodes 910, 920, 922 are routed along the same side of the input device 100 (e.g., all of the routing traces are disposed along a single side of the input device 100).

Figure 10:
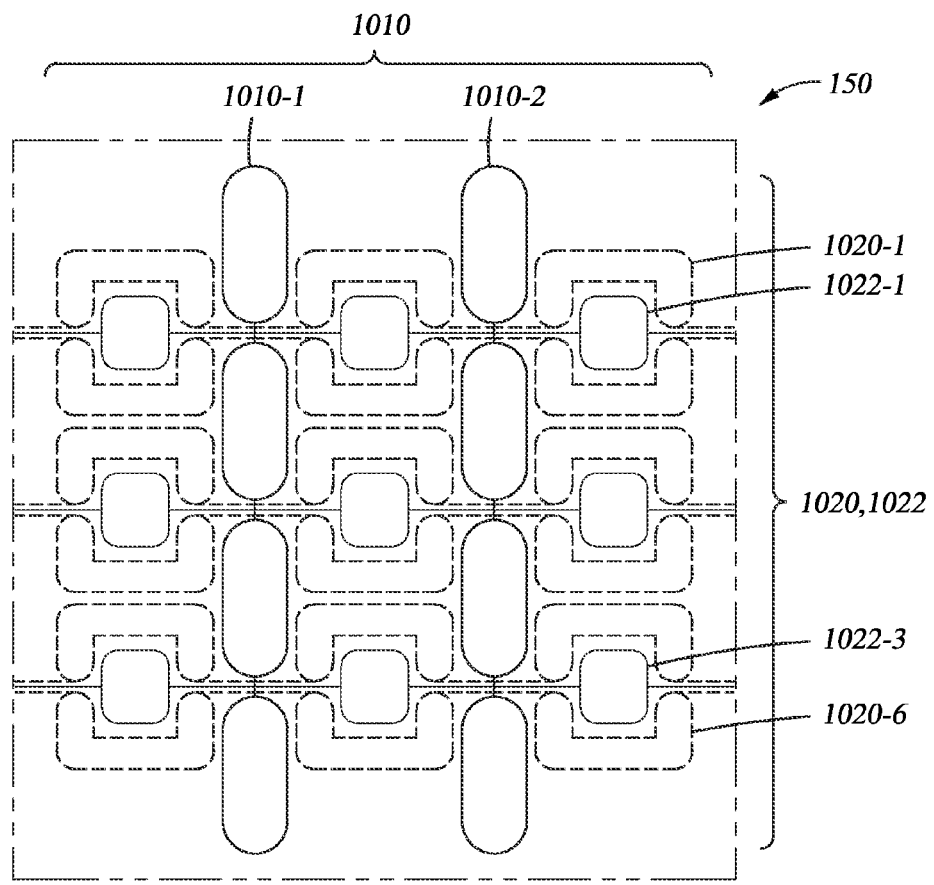
FIG. 10 illustrates a partial schematic plan view of sensing elements included in the input device of FIG. 1 in which sensor electrodes have topological asymmetry in accordance with embodiments of the disclosure.

FIG. 10 illustrates a partial schematic plan view of sensing elements 150 included in the input device 100 of FIG. 1 in which the sensor electrodes have topological asymmetry in accordance with embodiments of the disclosure. As shown, sensor electrodes 1020 and sensor electrodes 1022 traverse a horizontal axis. In some embodiments, each set of sensor electrodes 1020 and sensor electrodes 1022 are used to perform a different type of input sensing (e.g., hover/proximity sensing or touch sensing). Sensor electrodes 1010 traverse a vertical axis and may be used to perform one or more types of input sensing (e.g., hover/proximity sensing and touch sensing). Due to topological asymmetry created by the absence of a sensor electrode 1022 in-between each sensor electrode 1020, the geometrical symmetry on sensor electrodes 1020 is lost. To counteract this asymmetry, in some embodiments, sensor electrodes 1022 may be positioned on both sides of sensor electrodes 1020, for example, by allowing sensor electrodes 1022 to pass through sensor electrodes 1020 within each pixel, as shown in FIG. 8. In various embodiments, the sensor electrodes 1010, 1020, 1022 may be routed through each other such that all of the sensor electrodes 1010, 1020, 1022 are routed along the same side of the input device 100 (e.g., all of the routing traces are disposed along a single side of the input device 100).

Figure 11:
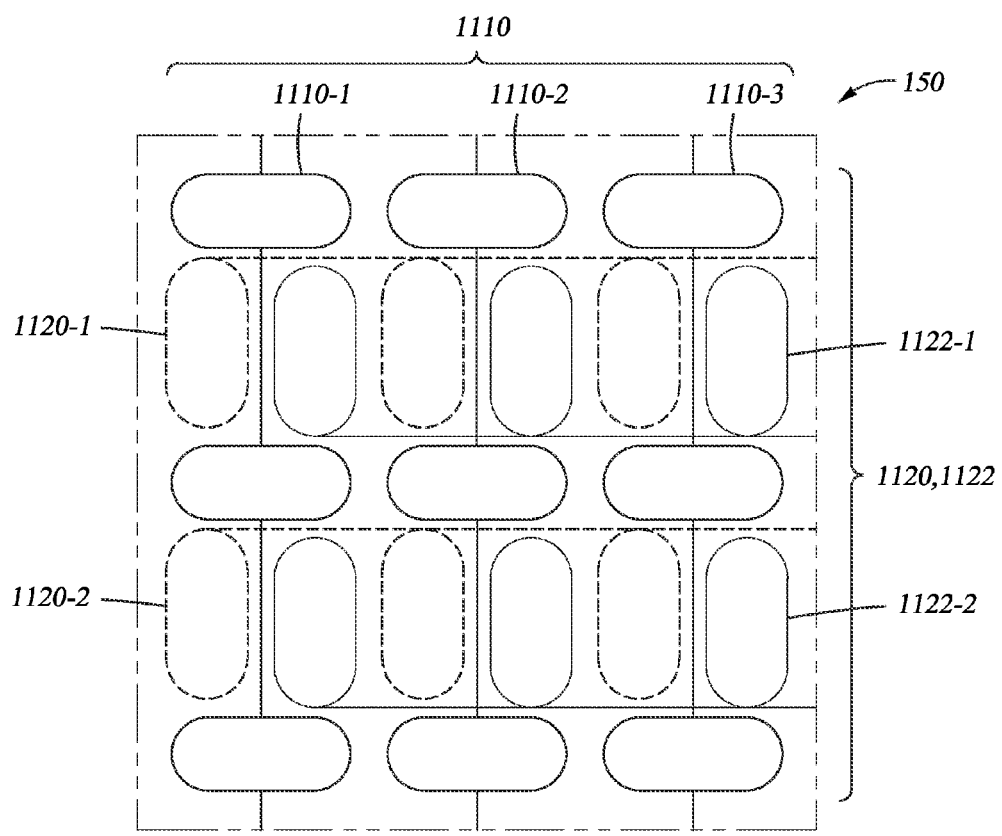
FIG. 11 illustrates a partial schematic plan view of sensing elements included in the input device of FIG. 1 in which sensor electrodes have geometrical asymmetry in accordance with embodiments of the disclosure.

FIG. 11 illustrates a partial schematic plan view of sensing elements 150 included in the input device 100 of FIG. 1 in which the sensor electrodes have geometrical asymmetry in accordance with embodiments of the disclosure. As shown, sensor electrodes 1120, 1122 traverse a horizontal axis and correspond to odd/even columns of a vertical axis defined by sensor electrodes 1110. Geometrical asymmetry exists due to the routing traces associated with sensor electrodes 1120, 1122 running in-between sensor electrodes 1122 and 1110 and in-between sensor electrodes 1120 and 1110, respectively, inducing a non-uniform response with respect to sensor electrodes 1110. In some embodiments, the sensor electrodes 1110, 1120, 1122 may be routed through each other such that all of the sensor electrodes 1110, 1120, 1122 are routed along the same side of the input device 100 (e.g., all of the routing traces are disposed along a single side of the input device 100).

Figure 12:
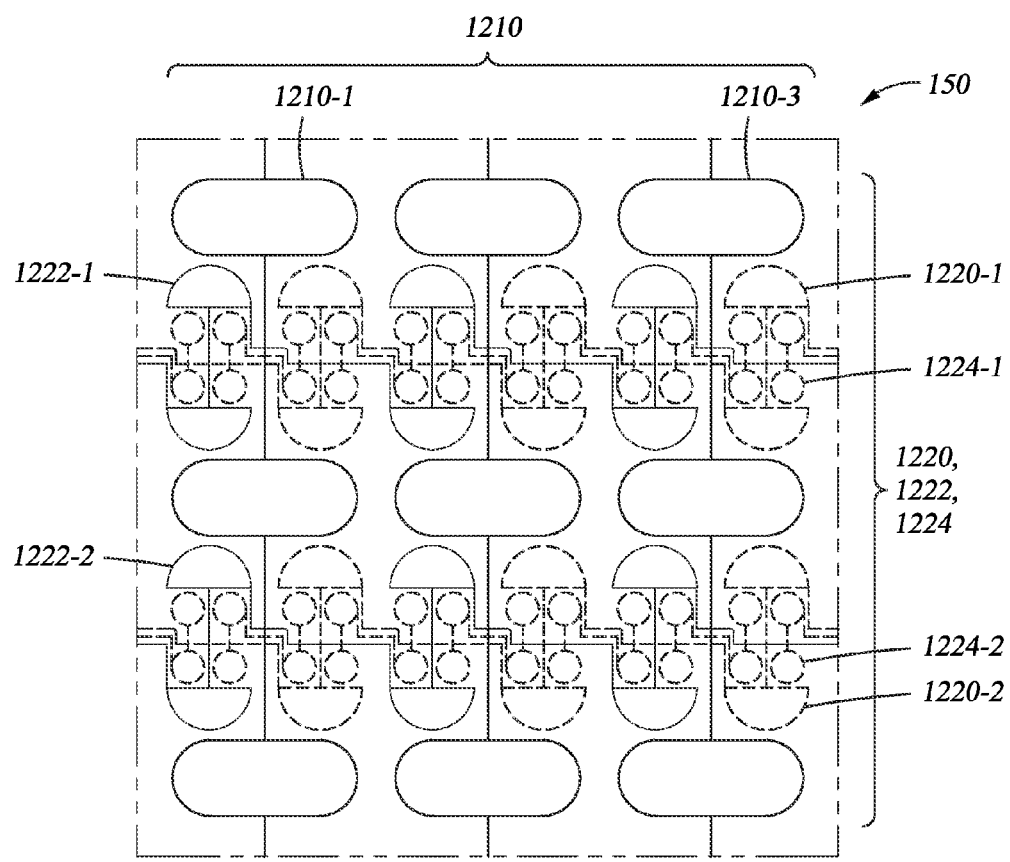
FIG. 12 illustrates a partial schematic plan view of sensing elements included in the input device of FIG. 1 in which three sensor electrode types are disposed along the same axis in accordance with embodiments of the disclosure.

FIG. 12 illustrates a partial schematic plan view of sensing elements 150 included in the input device 100 of FIG. 1 in which three sensor electrode types are disposed along the same axis in accordance with embodiments of the disclosure. Sensor electrodes 1220, 1222, 1224 may be configured to perform touch sensing and/or proximity/hover sensing while reducing the border width of the input device 100 by enabling the associated routing traces to be routed through the sensor region of the input device 100. In some embodiments, sensor electrodes 1220, 1222 may be configured as odd/even touch sensing receiver electrodes, while sensor electrodes 1224 may be configured as proximity/hover receiver electrodes. In other embodiments, in implementations that do not include proximity/hover sensing, sensor electrodes 1224 may be coupled to a system ground to mitigate the effect(s) of a weak ground connection between an input object 140 and the input device 100. In some embodiments, the sensor electrodes 1210, 1220, 1222, 1224 may be routed through each other such that all of the sensor electrodes 1210, 1220, 1222, 1224 are routed along the same side of the input device 100 (e.g., all of the routing traces are disposed along a single side of the input device 100).

Figure 13:
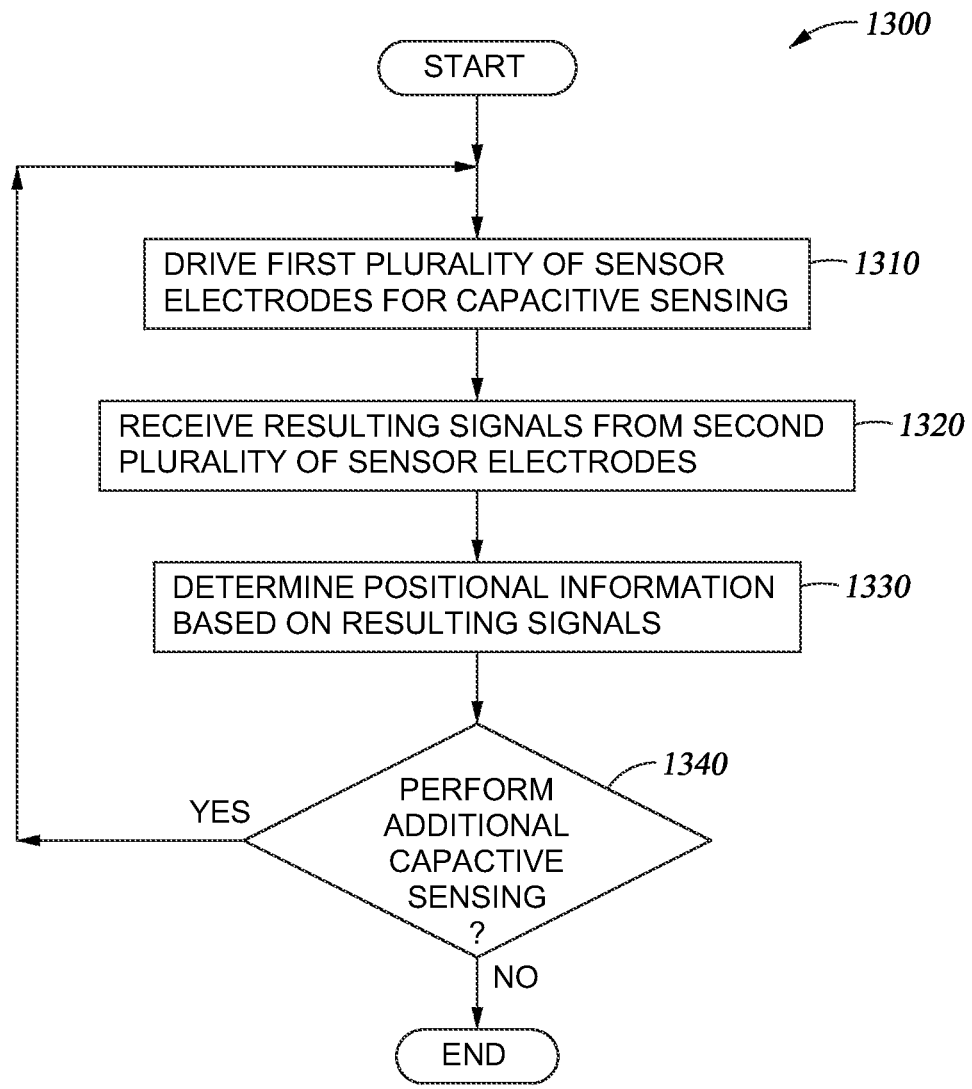
FIG. 13 is a flow chart of a method for performing input sensing using the input device of FIG. 1 in accordance with embodiments of the disclosure.

FIG. 13 is a flow chart of a method 1300 for performing input sensing using the input device 100 of FIG. 1 in accordance with embodiments of the disclosure. Although the method 1300 is described in conjunction with FIGS. 1-12, persons skilled in the art will understand that any system configured to perform the method, in any appropriate order, falls within the scope of the present disclosure.

The method 1300 begins at step 1310, where the driver module 240 drives one or more types of sensor electrodes (e.g., transmitter electrodes 310) for input sensing. At step 1320, the receiver module 245 receives resulting signals from one or more types of receiver electrodes (e.g., receiver electrodes 320, 322) while the sensor electrodes are being driven for input sensing. At step 1330, the determination module 250 determines positional information, such as the presence and location of an input object 140, based on the resulting signals. Then, at step 1340, the processing system 110 determines whether additional input sensing is to be performed. If additional input sensing is to be performed, then the method 1300 returns to step 1310. If no additional input sensing is to be performed, then the method 1300 ends.

Thus, the embodiments and examples set forth herein were presented in order to best explain the present disclosure and its particular application and to thereby enable those skilled in the art to make and use the embodiments of the disclosure. However, those skilled in the art will recognize that the foregoing description and examples have been presented for the purposes of illustration and example only. The description as set forth is not intended to be exhaustive or to limit the invention to the precise form disclosed.

The invention claimed is:
1. An input device comprising:
a first plurality of sensor electrodes disposed substantially parallel to each other;
a second plurality of sensor electrodes disposed substantially perpendicular to the first plurality of sensor electrodes, an areal extent of the first and second sensor electrodes defining a sensor region; and a plurality of routing traces disposed within the sensor region of the input device, wherein a first sensor electrode included in the first plurality of sensor electrodes is coupled to a first routing trace included in the plurality of routing traces, and the first routing trace is routed through a second sensor electrode included in the first plurality of sensor electrodes, wherein the first routing trace is electrically isolated from the second sensor electrode.

2. The input device of claim 1, wherein the second sensor electrode comprises a first electrode segment and a second electrode segment, and the first routing trace is routed between the first electrode segment and the second electrode segment.

3. The input device of claim 2, wherein the first electrode segment is electrically coupled to the second electrode segment via a jumper that traverses the first routing trace.

4. The input device of claim 2, wherein the first plurality of sensor electrodes are disposed on a first layer of the input device and the second plurality of sensor electrodes are disposed on a second layer of the input device.

5. The input device of claim 1, wherein a third sensor electrode included in the second plurality of sensor electrodes is routed through a fourth sensor electrode included in the second plurality of sensor electrodes.

6. The input device of claim 5, wherein the fourth sensor electrode comprises:
a first electrode segment and a second electrode segment, the first electrode segment electrically coupled to the second electrode segment via a first jumper that traverses the third sensor electrode.

7. The input device of claim 6, wherein the fourth sensor electrode is routed through the third sensor electrode, the third sensor electrode comprises a third electrode segment and a fourth electrode segment, and the third electrode segment is electrically coupled to the fourth electrode segment via a second jumper that traverses the fourth sensor electrode.

8. The input device of claim 1, wherein the first sensor electrode and the second sensor electrode comprise transmitter electrodes and the second plurality of sensor electrodes comprises receiver electrodes.

9. The input device of claim 1, wherein the length of each sensor electrode included in the first plurality of sensor electrodes is substantially equal to a width of the input device.

10. The input device of claim 1, further comprising a third plurality of sensor electrodes disposed proximate to the second plurality of sensor electrodes and configured for proximity sensing, wherein a third sensor electrode included in the third plurality of sensor electrodes includes a first electrode segment and a second electrode segment, and the first electrode segment is electrically coupled to the second electrode segment via a jumper that traverses at least one sensor electrode included in the second plurality of sensor electrodes.

11. The input device of claim 1, further comprising a plurality of ground electrodes disposed proximate to the second plurality of sensor electrodes, wherein a first ground electrode included in the plurality of ground electrodes includes a first electrode segment and a second electrode segment, and the first electrode segment is electrically coupled to the second electrode segment via a jumper that traverses at least one sensor electrode included in the second plurality of sensor electrodes.

12. The input device of claim 1, wherein each sensor electrode included in the first plurality of sensor electrodes has a width of two capacitive pixels.

13. An input device, comprising:
a first plurality of sensor electrodes disposed substantially parallel to each other;
a second plurality of sensor electrodes disposed substantially perpendicular to the first plurality of sensor electrodes, an areal extent of the first and second sensor electrodes defining a sensor region;
a plurality of routing traces disposed within the sensor region of the input device, wherein a first sensor electrode included in the first plurality of sensor electrodes is coupled to a first routing trace included in the plurality of routing traces, and the first routing trace is routed through a second sensor electrode included in the first plurality of sensor electrodes, where the first routing trace is electrically isolated from the second sensor electrode; and
a processing system coupled to the first plurality of sensor electrodes and the second plurality of sensor electrodes via the plurality of routing traces.

14. The input device of claim 13, wherein the second sensor electrode comprises a first electrode segment and a second electrode segment, and the first routing trace is routed between the first electrode segment and the second electrode segment.

15. The input device of claim 14, wherein the first electrode segment is electrically coupled to the second electrode segment via a jumper that traverses the first routing trace.

16. The input device of claim 14, wherein the first plurality of sensor electrodes are disposed on a first layer of the input device and the second plurality of sensor electrodes are disposed on a second layer of the input device.

17. The input device of claim 13, wherein the first sensor electrode and the second sensor electrode comprise transmitter electrodes and the second plurality of sensor electrodes comprises receiver electrodes.

18. A method of input sensing with an input device, the method comprising:
driving a first plurality of sensor electrodes disposed substantially parallel to each other for capacitive sensing;
receiving resulting signals from a second plurality of sensor electrodes disposed substantially perpendicular to the first plurality of sensor electrodes while the first plurality of sensor electrodes are being driven for capacitive sensing, the first and second sensor electrodes having an areal extent defining a sensor region;
receiving, in a processing system, the resulting signals via a plurality of routing traces disposed within the sensor region and coupled to the second plurality of sensor electrodes, wherein a first sensor electrode included in the first plurality of sensor electrodes is coupled to a first routing trace included in the plurality of routing traces, and the first routing trace is routed through a second sensor electrode included in the first plurality of sensor electrodes, and wherein the first routing trace is electrically isolated from the second sensor electrode; and
determining positional information based on the resulting signals.

19. The method of claim 18, wherein the first routing trace is further routed through a third sensor electrode included in the first plurality of sensor electrodes.

20. The method of claim 18, wherein a third sensor electrode included in the second plurality of sensor electrodes is routed through a fourth sensor electrode included in the second plurality of sensor electrodes.

21. The input device of claim 1, wherein the first routing trace is routed between segments of the second sensor electrode.

* * * * *